(12) United States Patent
Kimmel et al.

(10) Patent No.: US 7,739,501 B2
(45) Date of Patent: Jun. 15, 2010

(54) CRYPTOGRAPHIC KEY CONSTRUCT

(75) Inventors: Gerald D. Kimmel, Stevensville, MD (US); Ersin L. Domangue, Woodbine, MD (US)

(73) Assignee: InfoAssure, Inc., Annapolis, MD (US)

( * ) Notice: Subject to any disclaimer, the term of this patent is extended or adjusted under 35 U.S.C. 154(b) by 1264 days.

(21) Appl. No.: 11/193,911

(22) Filed: Jul. 29, 2005

(65) Prior Publication Data

US 2006/0218400 A1    Sep. 28, 2006

Related U.S. Application Data

(60) Provisional application No. 60/591,944, filed on Jul. 29, 2004.

(51) Int. Cl.
*H04L 9/22* (2006.01)
*H04K 1/00* (2006.01)

(52) U.S. Cl. .................. 713/168; 380/30; 380/38; 380/265; 380/44; 380/47

(58) Field of Classification Search ................ 713/168; 380/30, 38, 265, 44, 47
See application file for complete search history.

(56) References Cited

U.S. PATENT DOCUMENTS

| | | | | |
|---|---|---|---|---|
| 5,265,221 A | 11/1993 | Miller | ........................ | 395/725 |
| 5,276,901 A | 1/1994 | Howell et al. | ................ | 395/800 |
| 5,369,702 A | 11/1994 | Shanton | ......................... | 380/4 |
| 5,369,707 A | 11/1994 | Follendore, III | ............. | 380/25 |
| 5,375,169 A | 12/1994 | Seheidt et al. | ................. | 380/21 |
| 5,410,599 A | 4/1995 | Crowley et al. | ................. | 380/9 |
| 5,432,851 A | 7/1995 | Scheidt et al. | ................. | 380/25 |
| 5,440,290 A | 8/1995 | McCullough et al. | ........ | 340/552 |
| 5,680,452 A | 10/1997 | Shanton | .......................... | 380/4 |
| 5,717,755 A | 2/1998 | Shanton | ........................ | 380/25 |
| 5,787,173 A | 7/1998 | Seheidt et al. | ................. | 380/21 |
| 5,845,068 A | 12/1998 | Winiger | ........................ | 395/186 |
| 5,898,781 A | 4/1999 | Shanton | ........................ | 380/25 |
| 5,911,143 A | 6/1999 | Deinhart et al. | ............. | 707/103 |
| 5,920,630 A * | 7/1999 | Wertheimer et al. | ......... | 380/286 |
| 5,991,877 A | 11/1999 | Luckenbaugh | ............... | 713/200 |
| 6,014,666 A | 1/2000 | Helland et al. | ................. | 707/9 |
| 6,023,765 A | 2/2000 | Kuhn | .......................... | 713/200 |
| 6,041,411 A | 3/2000 | Wyatt | .......................... | 713/200 |
| 6,044,466 A | 3/2000 | Anand et al. | ................. | 713/200 |
| 6,055,637 A | 4/2000 | Hudson et al. | ............... | 713/201 |

(Continued)

OTHER PUBLICATIONS

Menezes, Alfred J. et al. Handbook of Applied Cryptography, 1997 CRC Press, LLC, pp. 524-529.*

*Primary Examiner*—Michael J Simitoski
(74) *Attorney, Agent, or Firm*—Connolly Bove Lodge & Hutz LLP

(57) ABSTRACT

A computer program product, for producing a cryptographic key label for use in exchanging information between first and second organizations of members, resides on a computer-readable medium includes computer-readable instructions configured to cause a computer to: produce a read-write cryptographic key using at least one base value; produce a write-only cryptographic key using the read-write cryptographic key; combine a first identifier, uniquely associated with the first organization, and a second identifier, uniquely associated with the key label to be produced, using a one-way function to produce a pedigree; and associate the pedigree with the read-write key and the write-only key to form the cryptographic key label.

12 Claims, 12 Drawing Sheets

U.S. PATENT DOCUMENTS

| | | | |
|---|---|---|---|
| 6,075,865 A | 6/2000 | Scheidt et al. | 380/255 |
| 6,088,679 A | 7/2000 | Barkley | 705/8 |
| 6,105,132 A | 8/2000 | Fritch et al. | 713/167 |
| 6,115,709 A | 9/2000 | Gilmour et al. | 707/9 |
| 6,141,754 A | 10/2000 | Choy | 713/200 |
| 6,202,066 B1 | 3/2001 | Barkley et al. | 707/9 |
| 6,229,445 B1 | 5/2001 | Wack | 340/572.7 |
| 6,229,894 B1 | 5/2001 | Van Oorschot et al. | 380/21 |
| 6,237,036 B1 | 5/2001 | Ueno et al. | 709/225 |
| 6,237,099 B1 | 5/2001 | Kurokawa | 713/200 |
| 6,256,773 B1 | 7/2001 | Bowman-Amuah | 717/1 |
| 6,266,417 B1 | 7/2001 | Scheidt et al. | 380/255 |
| 6,289,462 B1 | 9/2001 | McNabb et al. | 713/167 |
| 6,301,601 B1 | 10/2001 | Helland et al. | 709/101 |
| 6,311,278 B1 | 10/2001 | Raanan et al. | 713/201 |
| 6,314,409 B2 | 11/2001 | Schneck et al. | 705/54 |
| 6,321,334 B1 | 11/2001 | Jerger et al. | 713/200 |
| 6,324,646 B1 | 11/2001 | Chen et al. | 713/201 |
| 6,324,647 B1 | 11/2001 | Bowman-Amuah | 713/201 |
| 6,339,825 B2 | 1/2002 | Pensak et al. | 713/158 |
| 6,357,010 B1 | 3/2002 | Viets et al. | 713/201 |
| 6,370,573 B1 | 4/2002 | Bowman-Amuah | 709/223 |
| 6,385,724 B1 | 5/2002 | Beckman et al. | 713/167 |
| 6,405,364 B1 | 6/2002 | Bowman-Amuah | 717/101 |
| 6,442,620 B1 | 8/2002 | Thatte et al. | 709/316 |
| 6,449,723 B1 | 9/2002 | Elgressy et al. | 713/201 |
| 6,453,419 B1 | 9/2002 | Flint et al. | 713/201 |
| 6,473,791 B1 | 10/2002 | Al-Ghosein et al. | 709/217 |
| 6,473,794 B1 | 10/2002 | Guheen et al. | 709/223 |
| 6,487,665 B1 | 11/2002 | Andrews et al. | 713/201 |
| 6,490,680 B1 | 12/2002 | Scheidt et al. | 713/166 |
| 6,499,109 B1 | 12/2002 | Balasubramaniam et al. | 713/201 |
| 6,519,571 B1 | 2/2003 | Guheen et al. | 705/14 |
| 6,529,949 B1 | 3/2003 | Getsin et al. | 709/217 |
| 6,536,037 B1 | 3/2003 | Guheen et al. | 717/151 |
| 6,542,608 B2 | 4/2003 | Scheidt et al. | 380/44 |
| 6,549,623 B1 | 4/2003 | Scheidt et al. | 380/44 |
| 6,560,337 B1 * | 5/2003 | Peyravian et al. | 380/44 |
| 6,574,736 B1 | 6/2003 | Andrews | 713/201 |
| 6,584,569 B2 | 6/2003 | Reshef et al. | 713/201 |
| 6,587,857 B1 | 7/2003 | Carothers et al. | 707/102 |
| 6,604,198 B1 | 8/2003 | Beckman et al. | 713/167 |
| 6,606,386 B2 | 8/2003 | Scheidt et al. | 380/44 |
| 6,606,711 B2 | 8/2003 | Hill et al. | 713/201 |
| 6,608,901 B2 | 8/2003 | Scheidt et al. | 380/44 |
| 6,615,166 B1 | 9/2003 | Guheen et al. | 703/27 |
| 6,629,081 B1 | 9/2003 | Cornelius et al. | 705/30 |
| 6,629,105 B1 | 9/2003 | Young et al. | 707/103 R |
| 6,640,307 B2 | 10/2003 | Viets et al. | 713/201 |
| 6,651,109 B1 | 11/2003 | Beck et al. | 709/315 |
| 6,658,415 B1 | 12/2003 | Brown et al. | 707/10 |
| 6,662,357 B1 | 12/2003 | Bowman-Amuah | 717/120 |
| 6,678,696 B1 | 1/2004 | Helland et al. | 707/103 R |
| 6,678,705 B1 | 1/2004 | Berchtold et al. | 707/204 |
| 6,684,330 B1 | 1/2004 | Wack et al. | 713/162 |
| 6,687,375 B1 * | 2/2004 | Matyas et al. | 380/45 |
| 6,694,433 B1 | 2/2004 | Kolouch | 713/176 |
| 6,701,345 B1 | 3/2004 | Carley et al. | 709/205 |
| 6,714,962 B1 | 3/2004 | Helland et al. | 709/203 |
| 6,721,713 B1 | 4/2004 | Guheen et al. | 705/1 |
| 6,748,555 B1 | 6/2004 | Teegan et al. | 714/38 |
| 6,754,820 B1 | 6/2004 | Scheidt et al. | 713/166 |
| 6,754,884 B1 | 6/2004 | Lucas et al. | 717/108 |
| 6,757,898 B1 | 6/2004 | Ilsen et al. | 718/203 |
| 6,768,988 B2 | 7/2004 | Boreham et al. | 707/3 |
| 6,769,130 B1 | 7/2004 | Getsin et al. | 725/89 |
| 6,785,686 B2 | 8/2004 | Boreham et al. | 707/102 |
| 6,813,769 B1 | 11/2004 | Limprecht et al. | 719/315 |
| 6,850,252 B1 | 2/2005 | Hoffberg | 345/716 |
| 6,853,988 B1 | 2/2005 | Dickinson et al. | 705/75 |
| 6,859,810 B2 | 2/2005 | Andrei et al. | 707/102 |
| 6,871,231 B2 | 3/2005 | Morris | 709/225 |
| 6,871,232 B2 | 3/2005 | Curie et al. | 709/225 |
| 6,877,094 B1 | 4/2005 | DiGiorgio et al. | 713/176 |
| 6,901,426 B1 | 5/2005 | Powers et al. | 709/203 |
| 6,912,654 B2 * | 6/2005 | Murakami | 713/155 |
| 6,918,043 B2 | 7/2005 | Elgressy et al. | 713/201 |
| 6,918,107 B2 | 7/2005 | Lucas et al. | 717/124 |
| 7,181,620 B1 | 2/2007 | Hur | 713/171 |
| 2003/0169882 A1 * | 9/2003 | Rose | 380/270 |

* cited by examiner

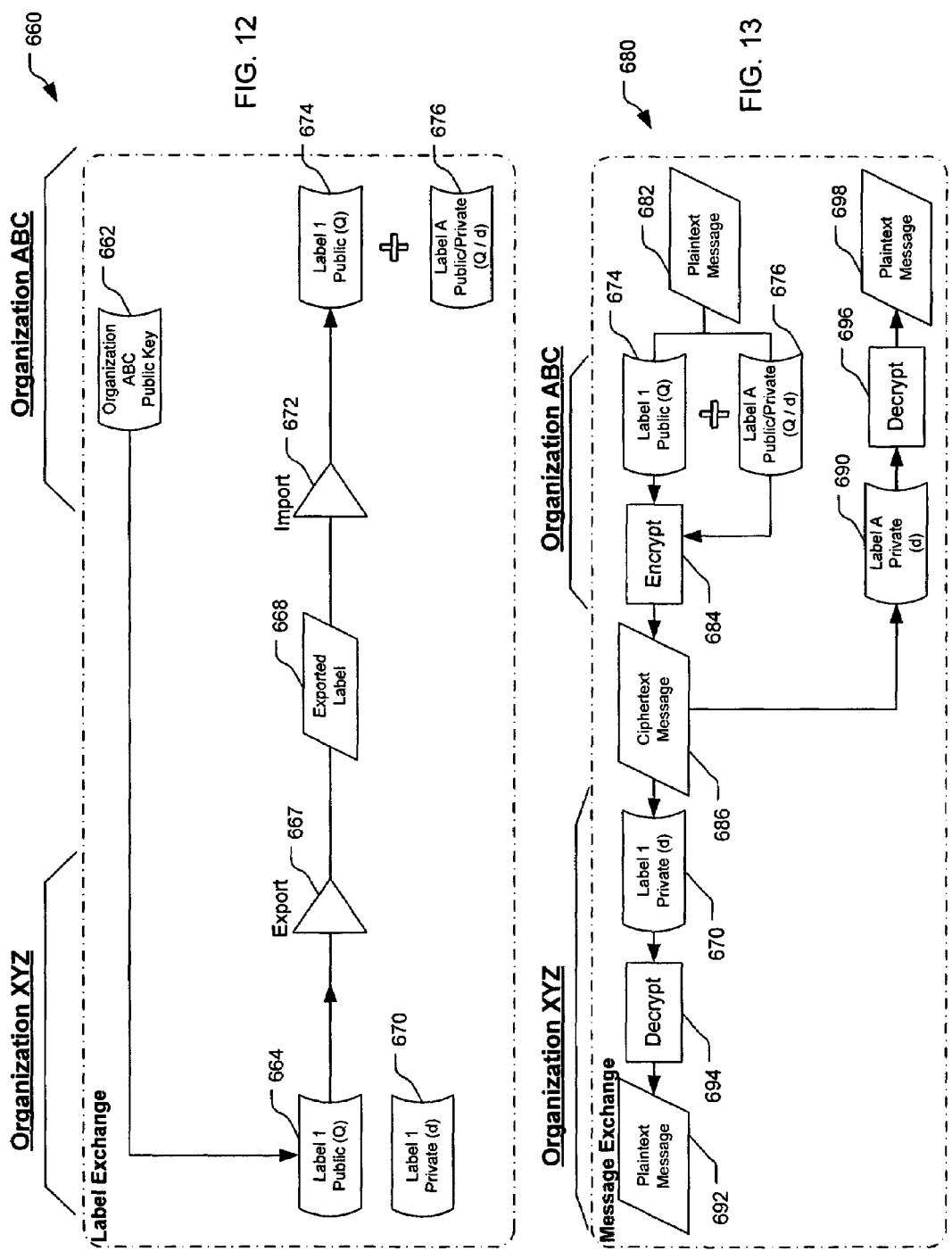

CRYPTOGRAPHIC KEY CONSTRUCT

CROSS-REFERENCE TO RELATED APPLICATIONS ACTIONS

This application claims the benefit of U.S. Provisional Application No. 60/591,944 filed Jul. 29, 2004, which is incorporated herein by reference. This application incorporates herein by reference each of the following applications: U.S. application Ser. No. 11/193,607, entitled: "Information-Centric Security", and filed Jul. 29, 2005, U.S. application Ser. No. 11/193,227, entitled "Cryptographic Key Management," and filed Jul. 29, 2005, and U.S. application Ser. No. 11/193,595, filed Jul. 29, 2005, and entitled "Object Access Level."

STATEMENT AS TO FEDERALLY-SPONSORED RESEARCH

This invention was made at least in part with Government support under STTR Contract No. N00014-04-C-0259, US Navy Office of Naval Research.

BACKGROUND

In today's dynamic, fast-paced environment, it is desirable to securely manage the expeditious exchange of ever-increasing amounts of on-demand information within fluid Communities of Interest (COIs). COIs include entities such as companies, agencies, organizations, and groups of entities such as governments and militaries (e.g., branches within a single government or between multiple governments). The Information Assurance (IA) solution used preferably provides the capability of sharing data (e.g., electronically) at the information/data object level (Information Centric Security or INFOCENSEC) across functions and organizations throughout an enterprise while providing data separation and confidentiality.

While electronic communication has benefits, electronic communication also has concerns, particularly in the area of protecting its confidentiality, integrity and its authenticity. This is compounded when dealing with multinational entities or multiple entities such as companies, agencies, or organizations with various levels of trust that desire to share information securely. Access to the message (i.e., plaintext information) is preferably controlled so that only those individuals authorized with a "need-to-know" are granted access to the plaintext information.

Techniques for addressing electronic communication security exist today. One technique uses cryptography to provide privacy and data integrity. Cryptography involves the conversion of data into a secret code that can either be transmitted over an electronic communication medium (e.g., LAN, WAN, Internet, etc.) or stored on a memory device (e.g., hard drive, USB Fob, CD, etc.). The original text, or "plaintext," is converted into a coded equivalent called "ciphertext" at the producer (e.g., author) via an encoding device that incorporates an encryption algorithm with a pre-determined sequence of steps. A plaintext is not necessarily composed of text, but may include text or graphics or other forms of information, and may be combinations of forms of information or a single form of information by itself. Many different algorithms exist and each algorithm uses a string of bits known as a "key" to perform the calculations. The larger the key (the more bits), the greater the number of potential patterns can be created, thus making it harder to break the code and descramble the contents. The data are encrypted, or "locked," by combining the bits in the key mathematically with the data bits. If the ciphertext message is intercepted (either during transit or at rest) by an unauthorized entity, the message is essentially worthless to the intruder, who does not possess the means to decrypt the encrypted message. Members of COIs often share information that has been encrypted to help ensure the safe transfer and storage of information. COI members are members of cryptographic domains, with members of each domain using a common set of cryptographic parameters for an encryption algorithm, e.g., which base values are used in cryptography.

On the receiving side (e.g., consumer) of an encrypted communication, a decoding device or decrypting engine is provided. The decoding device accepts the ciphertext message and the same cryptographic key that was used during the encryption process is used to decode (decrypt) the ciphertext and turn it back into a plaintext message that corresponds to the original message.

The manner in which the key and the algorithm are applied in a communication process, and the manner in which the keys are managed, define a cryptographic scheme. There are many conventional cryptographic schemes in use today. The two most popular of these are public-key cryptography and Pretty Good Privacy (PGP). The keys used in these schemes incorporate a combination of a public key component that is available to anyone who wants to encrypt (e.g., a producer) a message, and a private key component that is typically held by the recipient (e.g., a consumer) to decrypt the ciphertext back to the original plaintext message.

There are a number of considerations for determining whether a particular cryptographic scheme is desirable for the application in which it is to be used. For example, the following may be considered.

1. The degree of difficulty to defeat the cryptography. This refers to the amount of effort required for an unauthorized entity to decrypt the ciphertext message. To improve the security of the cryptographic scheme is to reduce the likelihood that a valid key can be stolen, calculated, or discovered (e.g., compromised). The more difficult it is for an unauthorized entity to obtain a valid key, the more secure the cryptographic scheme.

2. The means to dynamically add, update and/or revoke a member's access (i.e., retract an entity's access privileges). Revocation refers to preventing access to material encrypted subsequent to revocation, even though access to material encrypted during a member's period of legitimate access may not be stopped. Once the decision to revoke (i.e., to remove access to some portion of the member's access or completely remove the member from accessing any/all protected data) is made, new encryption/decryption access denial should be as complete and rapid as security risks warrant. The timeliness of distributing entity updates/revocation may greatly affect the security of the cryptographic scheme.

3. Whether the cryptographic key management scheme supports cross-domain (e.g., different cryptographic domains) information sharing and can provide persistent access control to the cryptographic keys for the ciphertext message. The assured information-sharing cornerstone is to provide the ability to dynamically share information at multiple sensitivity (e.g., classification) levels among various entities such as countries, organizations, agencies, etc. Information access may be based on mission need, information sensitivity, entity's identity and privileges, and level of protection provided by an entity's environment.

4. Scalability. There are many aspects of scalability to be considered in evaluating key management systems, such as: Generation, distribution, revocation and recovery of keying material; re-key interval (i.e., crypto period); updating and maintaining keys for users including users changing roles within a community of interest (COI) as well as adding/changing/revoking of access requirements, e.g., on an as-needed basis; COI interoperability, including multiple nations as well as cooperative COIs; access control to content at the object level; and support for dynamic resource management.

SUMMARY

In general, in an aspect, the invention provides a computer program product for producing a cryptographic key label for use in exchanging information between first and second organizations of members, the computer program product residing on a computer-readable medium and including computer-readable instructions configured to cause a computer to: produce a read-write cryptographic key using at least one base value; produce a write-only cryptographic key using the read-write cryptographic key; combine a first identifier, uniquely associated with the first organization, and a second identifier, uniquely associated with the key label to be produced, using a one-way function to produce a pedigree; and associate the pedigree with the read-write key and the write-only key to form the cryptographic key label. It is well-known that computer-readable media may include storage media and transmission media.

Embodiments of the invention may include one or more of the following features. The computer program product further includes instructions configured to cause the computer to associate parameters of an encryption technique associated with the read-write key with the pedigree, the read-write key and the write-only key as part of the label. The computer program product further includes maintenance instructions configured to cause the computer to alter at least one of the at least one base value. The maintenance instructions are configured to cause the computer to alter the at least one of the at least one base value at regular time intervals. The one-way function is a cryptographic hash function.

In general, in another aspect, the invention provides a data arrangement stored in memory or transmitted electrically, the data arrangement including, in combination: a read-write cryptographic key; a write-only cryptographic key; and a pedigree comprising a result of a one-way function applied to a first unique identifier of an organization and a second unique identifier of the data arrangement.

Embodiments of the invention may include one or more of the following features. The pedigree is the result of a cryptographic hash function applied to the first and second identifiers. The data arrangement further includes an indication of a cryptographic technique associated with the read-write cryptographic key. The indication is indicative of a cryptographic parameter of the cryptographic technique. The data arrangement further includes a human-readable name. The data arrangement comprises a portion of a memory. The data arrangement comprises signals.

In general, in another aspect, the invention provides a computer program product residing on a computer-readable medium and including computer-readable instructions configured to cause a computer to: use a first one-way function to produce a first sequence of forward cryptographic base values; use a second one-way function to produce a second sequence of backward cryptographic base values; and combine corresponding forward and backward cryptographic base values to produce a third sequence of cryptographic keys.

Embodiments of the invention may include one or more of the following features. The instructions configured to cause a computer to combine the base values are configured to cause the computer to combine an $n^{th}$ forward cryptographic base value of the first sequence and a $(m-n+1)^{th}$ backward cryptographic base value of the second sequence to produce an $n^{th}$ one of the cryptographic keys of the third sequence. The computer program product further includes key-production instructions configured to cause the computer to send, toward a recipient, at least one of the base values from at least one of the sequences to a recipient to limit which cryptographic keys of the third sequence the recipient can produce. The key-production instructions are configured to cause the computer to send one of the forward base values from the first sequence and one of the backward base values from the second sequence to limit which of the cryptographic keys of the third sequence the recipient can produce to a range of the cryptographic keys of the third sequence. The range is a consecutive group of the cryptographic keys in the third sequence.

In accordance with implementations of the invention, one or more of the following capabilities may be provided. A cryptographic key management solution may be difficult to defeat, allow for dynamic additions, updates, and/or revocations, provide scalability, support cross-domain information sharing with persistent access control to cryptographic keys, and support cross-domain capabilities without inducing management overhead by requiring entity in a COI to manage members of entity of the COI. It is therefore an object of this invention to provide a process and apparatus for assembling keys that provides added security against compromising a communication by unauthorized entities. Key components may be generated, distributed, and controlled within a cryptographic key management scheme that facilitates secure cross-domain communication sharing while maintaining data separation on a need-to-know basis for authorized users within a predetermined COI. Key material may be established, managed and distributed among disparate entities for both small ad hoc COIs as well as large COIs involving many entities without creating management overhead of members by any one entity. Key components may be developed within a cryptographic key management scheme that enables an assured dynamic and timely update and/or revocation of individual member privileges so that the member is afforded access to plaintext information substantially only during the time frame in which the member is authorized to do so. Key components may be developed within a cryptographic key management scheme that supports strategic as well as tactical environments. In strategic environments, all members have access to a network infrastructure LAN, WAN, Internet, etc., whereas, in a tactical environment, members are separated/isolated from a network in a standalone environment. Key components may be developed within a cryptographic key management scheme that cannot be easily reproduced by unauthorized parties. Cross-domain information sharing can be supported and persistent content-based access control provided on a data object within a network-centric environment that supports a tactical, client-only environment. Scalability is facilitated and single point of failure DoS attacks can be mitigated.

Also in accordance with implementations of the invention, one or more of the following capabilities may be provided. Access privileges of individual members can be updated electronically over a network. An individual member/device (e.g., computing device such as sensors, PDA, laptop, etc.) or an entire organization, country, agency, etc. can be removed from continuing or future access to information/resources. Who has access to what information can be closely controlled. Data separation can be achieved, e.g., through creation, support, reconfiguration and/or revocation of multiple communities of interest (COIs). Dynamic COIs can be established and maintained. Access privileges can be authenticated and distributed to individual members of an organization using various identity-based key management systems (e.g., PKI). A cryptography solution is scalable and usable for information centric data protection, specifically for data at rest. Distribution and maintenance of information access can be significantly enhanced. More efficient, scalable and adaptive key management solutions can be provided.

Also in accordance with implementations of the invention, one or more of the following capabilities may be provided. Object use in a network can be monitored (e.g., constantly) to provide feedback on information dissemination. User roles/labels can be dynamically updated, e.g., based upon usage and need-to-share. Information can be pushed to and/or pulled from selected individuals/systems. Roles/labels can be updated based upon monitored activity. Problems/vulnerabilities can be identified based upon monitored activity. Amounts of information a person can work with at one time can be increased. Time to review, analyze, and implement labeling requirements for a role-based access control (RBAC) solution can be reduced. Management and dissemination of intellectual/data assets can be enhanced. Users can rapidly discover hidden information relationships from varying data sources. Unanticipated relationships of data can be identified and changes in information access examined. Analytical tools allowing members to investigate the Document groupings can be investigated, document contents queried, and trends, e.g., in access, investigated.

RBAC refers to a class of security mechanisms (e.g., metadata or labels) that mediate access to resources (e.g., data, applications, systems, devices, networks, etc.) through organizational identities, called roles. Typically, the roles within an organization often relate to other roles in terms of their capabilities or access privileges. Allowing administrators to define roles with respect to other roles can improve efficiency and consistency—especially in organizations that have a large number of roles. Defining roles with respect to other roles can also be used to dynamically change member access privileges for changing situations and/or events all based upon policy. Defining roles with respect to other roles can also provide means to push to and/or pull data from members based upon the content of the information as well as the roles of the members.

These and other capabilities of the invention, along with the invention itself, will be more fully understood after a review of the following figures, detailed description, and claims.

BRIEF DESCRIPTION OF THE FIGURES

FIGS. 12-13 are block flow diagrams of label importing and exporting.

DETAILED DESCRIPTION OF PREFERRED EMBODIMENTS

Embodiments of the invention provide techniques for scalable cryptographic key management that supports cross-domain information sharing. Embodiments of the invention provides techniques for generating a key encrypting key (KeK), protecting, managing, and distributing labels/cryptographic keys used to generate the KeK that is used to control access to a working key used to encrypt plaintext messages/data and decrypt ciphertext. For example, in key management system a private cryptographic key and a public cryptographic key may be derived and used to obtain a label. This label (either a sensitivity label or a category label, as described below) can be parsed into pieces that are unique for each user of the label and the unique pieces stored. The pieces can be recombined into the label. The label is used to generate a KeK that is used to encrypt a data encryption key in a key protection module. The data encryption key is used to encrypt plaintext data to produce ciphertext and the encrypted data encryption key is put in a header along with the ciphertext. The encrypted data encryption key is decrypted using the re-generated KeK and the data encryption key is used to decrypt the ciphertext. This encryption system is exemplary, however, and not limiting of the invention as other implementations in accordance with the disclosure are possible.

Figure 1:
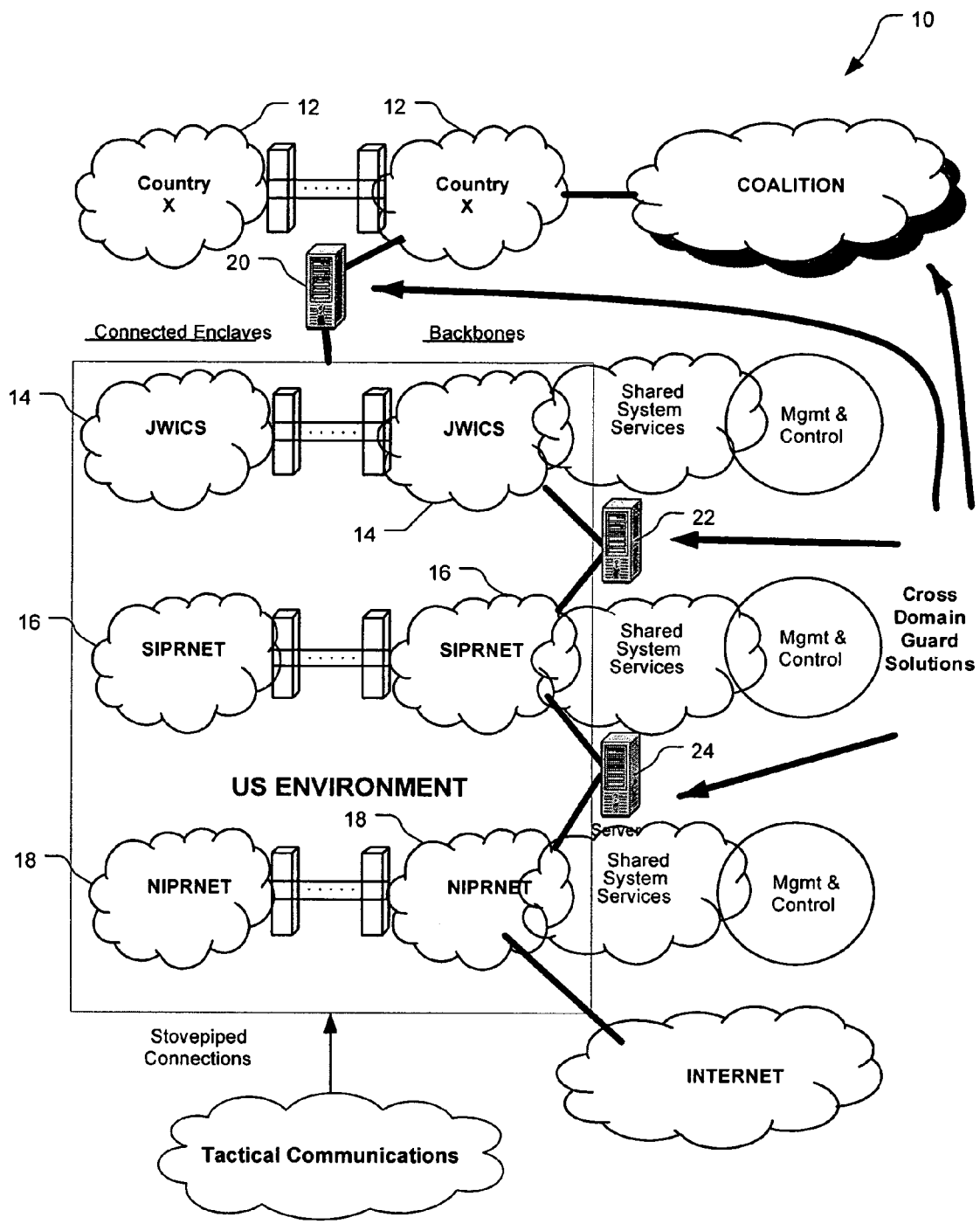
FIG. 1 is a diagram of a stove-piped security solution using separate networks.

Referring to FIG. 1, historically, in "secure" information-sharing solutions, such as a solution 10, with multinational, classified, information sharing, users have operated between segregated networks 12, 14, 16, 18 of multiple security levels (MSLs). These stove-piped network environments allow the user to send and receive information across a single security level but use controlled interface devices (i.e., guards or sanitizers) 20, 22, 24 to securely bridge the information flow between the disparate networks 12, 14, 16, 18. When a controlled interface device is not available for the architecture (or for a specific data type), users typically transfer information between networks via hand-transferred media (air gap) or not at all.

The cross-domain controlled interface devices 20, 22, 24, commonly known as guards, allow the exchange of data via secure and sometimes automated means. Though the devices themselves may securely process information at multiple levels simultaneously, and though these devices may be defined as Multi-Level Security (MLS) systems, they typically do not provide MLS work environments. The segregated, single-level networks 12, 14, 16, 18, are separately maintained in MLS architecture. Unlike this stove-pipe approach, an MLS network environment preferably stores and processes information of different security domains—allowing users to exchange information only at levels they are authorized while denying access to information they are not cleared to see.

Figure 2:
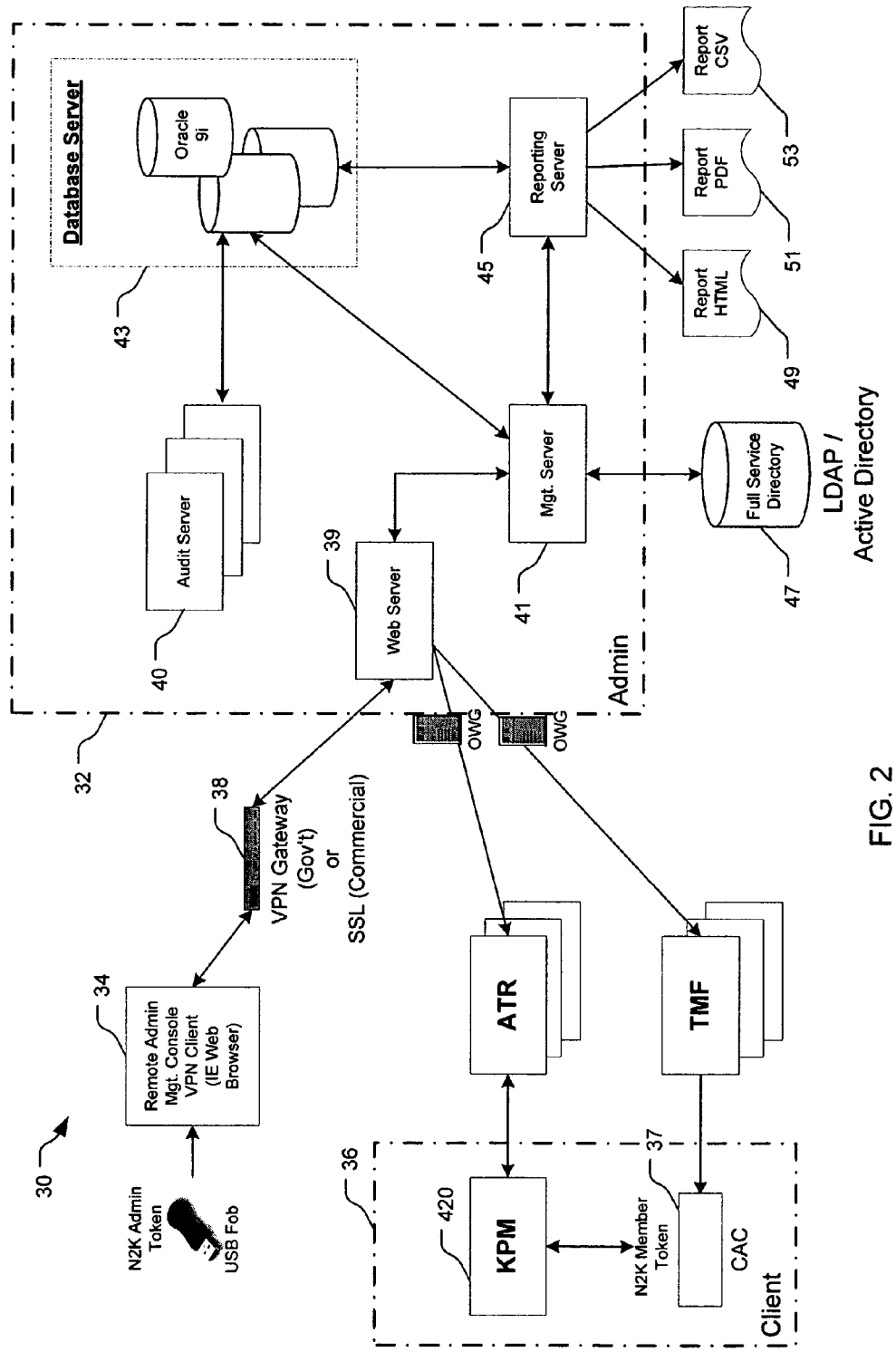
FIG. 2 is a diagram of an information-centric security system architecture.

Referring to FIG. 2, a system (architecture) 30 for secure data storage and communication includes an administration system 32, a remote administration management console 34, and a client 36. The system 30 is referred to as the Need2Know® system, or N2K™ for short. The administration system 32 can communicate with the console 34 through a network, here through a gateway 38, to interact with a network browser of the console 34. The console 34 and the client 36 can be computers as described with respect to FIG. 3 below. The administration system 32 is configured to communicate with the client 36 to send the client Abridged Token Repository (ATR) and Token Maintenance File (TMF) information, described more fully below. The client 36 includes a key protection module (KPM) 420 (described more fully below with respect to FIG. 9) and a token device 37 such as a Department of Defense (DoD) Common Access Card (CAC). The KPM 420 supports cross-domain information sharing and can provide persistent content-based access control (CBAC) on a data object within a network-centric environment that supports a tactical, client-only environment using a secure parser function to split labels into substantially unusable cryptographic keys and storing them in specified locations. The administration system 32 includes a web server 39, an audit server 40, a management server 41, a database server 43, and a reporting server 45. The web server 39 is configured to exchange information with the gateway 38 and the management server 41. The audit server 40 is configured to monitor information stored in the database server 43. The management server 41 is configured to interact and exchange information with the web server 39, the database server 43, the reporting server 45, and a full service directory 47 that uses lightweight directory access protocol (LDAP). The management server 41 includes computer software code instructions for causing a processor of the server 41 to perform operations described below. The components of the administration system 32 may be combined or distributed, e.g., for performance, security, and/or redundancy considerations. In particular, the server 41 is configured to determine and distribute cryptographic labels, to oversee the assignment of roles and to control access privileges of clients (e.g., members) based upon roles and security levels of clients, and to coordinate domains as described below. Each organization (e.g., country, agency, etc.) may have its own administration system 32 that coordinates the domain(s) within their respective organization and there may be at least one administration system 32 or management server 41 that oversees groups (coalitions) of domains. Through the remote console 34, the administrator enrolls/registers members in domains, assigns members to organization units, controls member administration, and assigns roles to members. These are maintained in the database 43. The reporting server 45 is configured to provide reports regarding the cryptographic key management administrative information, e.g., in the form of HTML reports 49, PDF reports 51, and CSV (Common Separated Value) reports 53.

The system 30 provides a scalable cryptographic key management solution for cross-domain information sharing. The system 30 provides the KPM 420 that incorporates strong, configurable identification, authentication, and authorization mechanisms, providing persistent access control on a data object in a network-centric environment while providing for a deployed tactical client-only environment. The system 30 further provides specifications (e.g., open API) for header information, and a hierarchical administrative structure that is scalable and supports key management/distribution across multiple cryptographic domains. The system 30 further provides active auditing, through the audit server 40, of both client and administrative functions, and reporting of activity through the reporting server 45. The system 30 also protects applications/information with an application encapsulation technique that protects against, e.g., hackers and malicious code attacks in a software-based environment, that helps protect information in transit, at rest, and in process. Other embodiments of the system 30, however, are possible, including embodiments that provide fewer, more, and/or different features than listed here.

Figure 3:
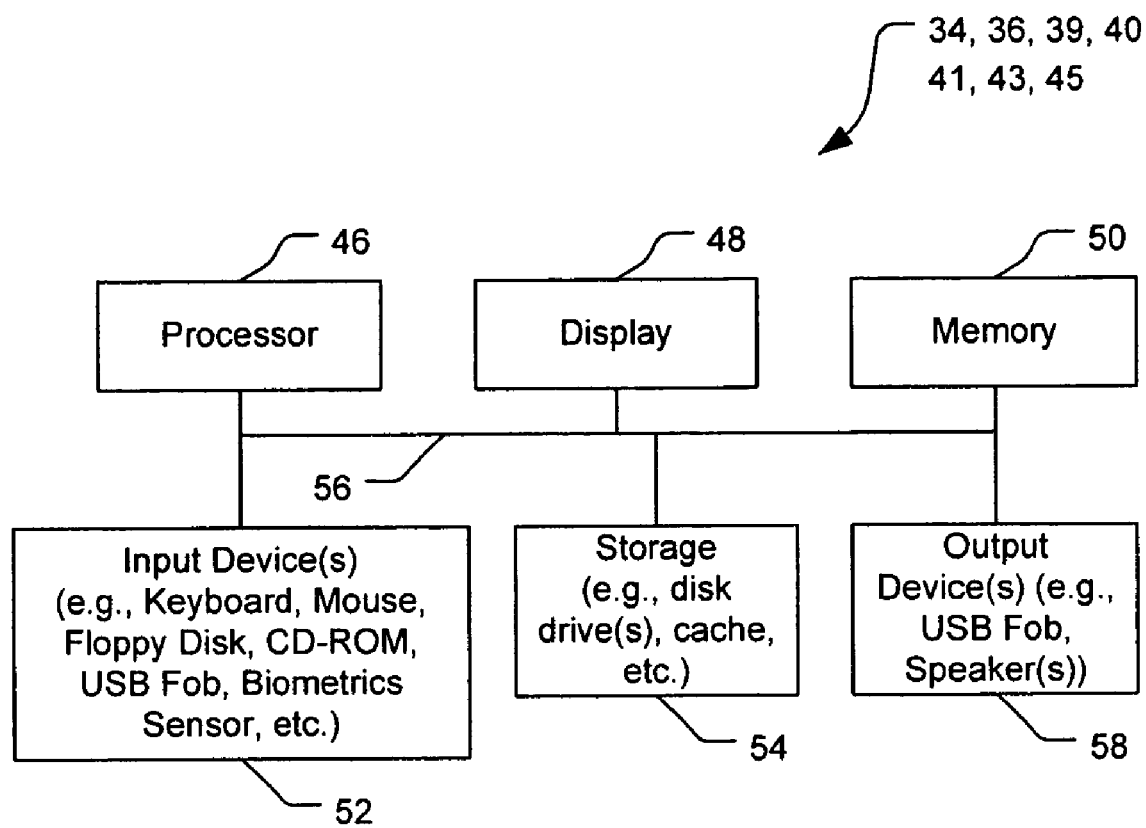
FIG. 3 is a block diagram of computers shown in FIG. 2.

Referring also to FIG. 3, each of the servers 39, 40, 41, 43, 45, the console 34, and the client 36 preferably includes a processor 46, memory 50, one or more input devices 52, and storage 54, and may also include a display 48. The processor 46 can be a personal computer central processing unit (CPU) such as a processor made by Intel® Corporation or AMD® Corporation, although processors made by other companies may be used and thus the invention is not limited to using processors made by either of these companies. The display 48 is a cathode-ray tube (CRT), although other forms of displays are acceptable, e.g., liquid-crystal displays (LCD) including TFT displays. The memory 50 includes random access memory (RAM) and read-only memory (ROM). The input device(s) 52 may include a keyboard, mouse, floppy disk drive, CD-ROM, a USB Fob, and/or a biometrics sensor, etc. The input device(s) 52 provides for data input by a user (not shown) and/or a token, e.g., to input cryptography keys. The storage 54 may include a hard-disk drive, and can include floppy-disk drives, a CD-ROM drive, and/or a zip drive. The components 46, 48, 50, 52, and 54 are connected by a bus 56 for communication between the components. The server 41 and the client 36 can store, e.g., in the memory 50, software code containing instructions for controlling the processor 46 to perform functions described below. In particular, the server 41 and the client 36 can store and/or process encryption keys or portions thereof, including labels and label splits described below. The client 36 can also encrypt information, transmit and/or store the encrypted information, and receive and/or retrieve encrypted information and decrypt the encrypted information.

Figure 4:
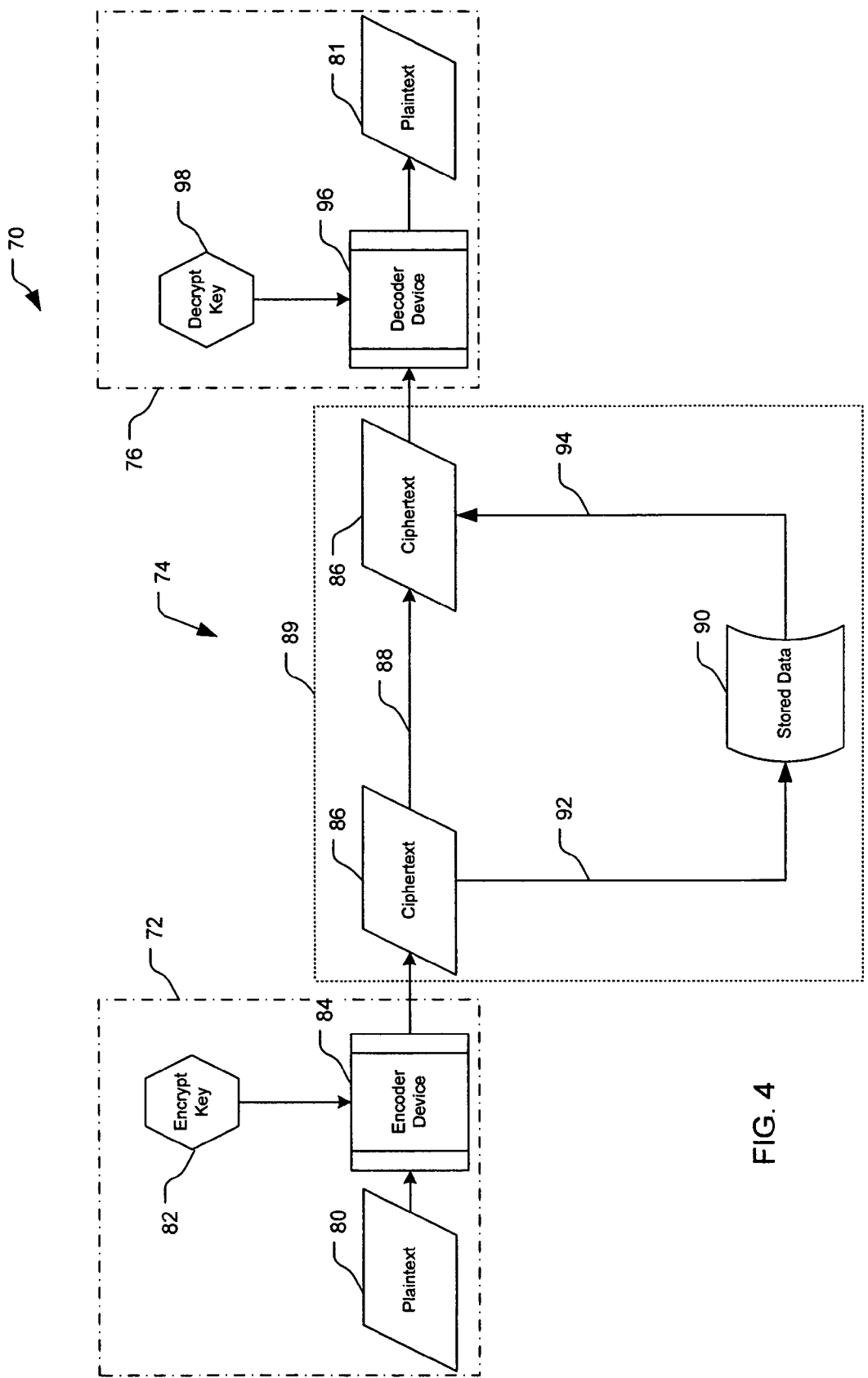
FIG. 4 is a block diagram of a communications event using cryptography.

In operation, referring to FIG. 4, with further reference to FIGS. 2-3, a process 70 for encrypting, transmitting and/or storing, and decrypting information using the system 30 includes the stages shown. The process 70, however, is exemplary only and not limiting. The process 70 may be altered, e.g., by having stages added, removed, or rearranged.

At stage 72, the communication originates at an origination space such as the client 36. The origination space is the place and time at which the communication originates. At this stage, unencrypted information (plaintext) 80 is encrypted using an encryption key 82 by an encryption or encoding device (encrypt text/key relation) 84 to produce encrypted information, i.e., ciphertext 86.

At stage 74, the ciphertext 86 is communicated to a destination space, being the time and place at which the communication is to be decoded. Stage 74 may comprise, e.g., transmitting the ciphertext 86 from the client 36 to another computer without storing the ciphertext 86 (aside from caching the ciphertext 86 in network hops, for example) as indicated by an arrow 88. Alternatively, the stage 74 may comprise storing the ciphertext 86 in a storage 90 as indicated by an arrow 92 and retrieving the ciphertext 86 as indicated by an arrow 94. For example, the client 36 may store the ciphertext 86 in its memory 50 and retrieve it at a later time. Further, the stage 74 may comprise a combination of storing and transmitting, e.g., by having the client 36 transmit the ciphertext 86 to a network storage device, and having the ciphertext 86 later transmitted to the a destination space for decoding.

At stage 76, the ciphertext 86 is received by the destination space and decoded/decrypted. An authorized entity applies a decoding device (decrypt text/key relation) 96 using a proper decryption key 98 to decrypt the ciphertext 86 to produce decrypted plaintext 81 corresponding to (e.g., identical to) the input plaintext 80.

The origination space and the destination space may be disposed at remote locations (e.g., physically different ones of the computing devices 40, 42, 44). Alternatively, the origination and destination spaces may be collocated but displaced in time (e.g., the same physical computing device 40). The space and time correspondence between the origination space and destination space may vary depending on the nature of a particular communication. The origination space and the destination space are coupled to a common communications channel 89. This communications channel 89 may bridge a physical space, such as empty air in the case of cellular voice telephone call. Alternatively, the communications channel 89 may be the temporary storage 90 for the communication while time passes between the origination space and the destination space. For example, the communication may be a message left in the memory 50 of the client 36 by a first user for a second user to retrieve and read at a later time on the same client 36. As another alternative, the communications channel 89 may be used to place data in the temporary storage 90 for the communication while time passes between the origination space and the destination space, with the message being left in memory on a network storage device by a first user of the client 36 for a second user to retrieve and read at a later time through the communications channel 89 on a different computing device at the destination space. The communications channel 89 may also be a combination of the two, such as sharing communications through email services over the Internet or a LAN/WAN.

The origination space and the destination space can be, for example, computers (e.g., the computers 40, 42, 44), or even the same computer (e.g., the client 36). For example, the client 36 may store the text/key relation 84 and/or 96 in the memory 50. The processor (e.g., a microprocessor or similar controller) 46, along with a control structure and the memory 50 (e.g., RAM) for storing original plaintext and keys provided by a user, can be included in both the origination space and the destination space and can perform the functions of the encryption 84 and the decryption 96. The input device(s) 52 can accept the encryption key 82 and the plaintext message 80 from the origination user, and the decryption key 98 and the ciphertext message 86 from the destination user. At the destination space, an output device, such as the display/monitor 48, the disk drive 54, or the output device(s) 58 may present the decrypted plaintext message 81 to the destination user. The text/key relation 84 and/or 96 can be stored on a floppy disk or other permanent and/or temporary portable storage to facilitate different text/key relations 84 and/or 96 to be applied by different users and/or in different situations.

Other measures are preferably used to help keep the system 30 secure. For example, as an added level of protection, using the invention the data encryption key 82 can also be encrypted. The encrypted data encryption key (dek) 82 can be sent along with the ciphertext 86, e.g., as a header associated with the ciphertext 86, to the destination. The encrypted dek can be decrypted by an authorized destination and used to decrypt the ciphertext 86. Cryptographic keys are also periodically changed to help keep the system 30 secure. The system 30 caters not only to data in transit but also data at rest (e.g., computer file storage), and provides a method of key recovery. The ability to recover old values, however, is constrained to go back only as far as authorized by the administrative system 32 for a member using a backwards secrecy value, explained more fully below. Indeed, the system 30 can prevent or permit recovery of old values entirely.

One-way functions (e.g., cryptographic hash algorithms) are used by the server 41 to generate new keys from old. The one-way functions provide members with a means to recover keys used in the past. The functions also provide administrators with a measure of control over key recovery while still retaining security.

When a label is produced, three values are generated at random: a base value (b), a backward controlling value (c) and a stepping key (s). The base value is concatenated with the stepping key and hashed to produce the private key. This is repeated f times where f is about 65,000 (although other values of f may be used). This value is called $b_f$. Concatenating $b_f$ with $c_1$, hashing this value and then reducing it modulo q derives the first maintenance-level private key. The public key is generated in the usual way from the private key.

Deriving subsequent key pairs proceeds by calculating $b_{(f-l+1)}$ and $c_l$, where l is the maintenance step. The two values are concatenated, hashed, then reduced modulo q producing the private key for that maintenance step. The public key corresponding to this step is calculated in the normal way.

Figure 5:
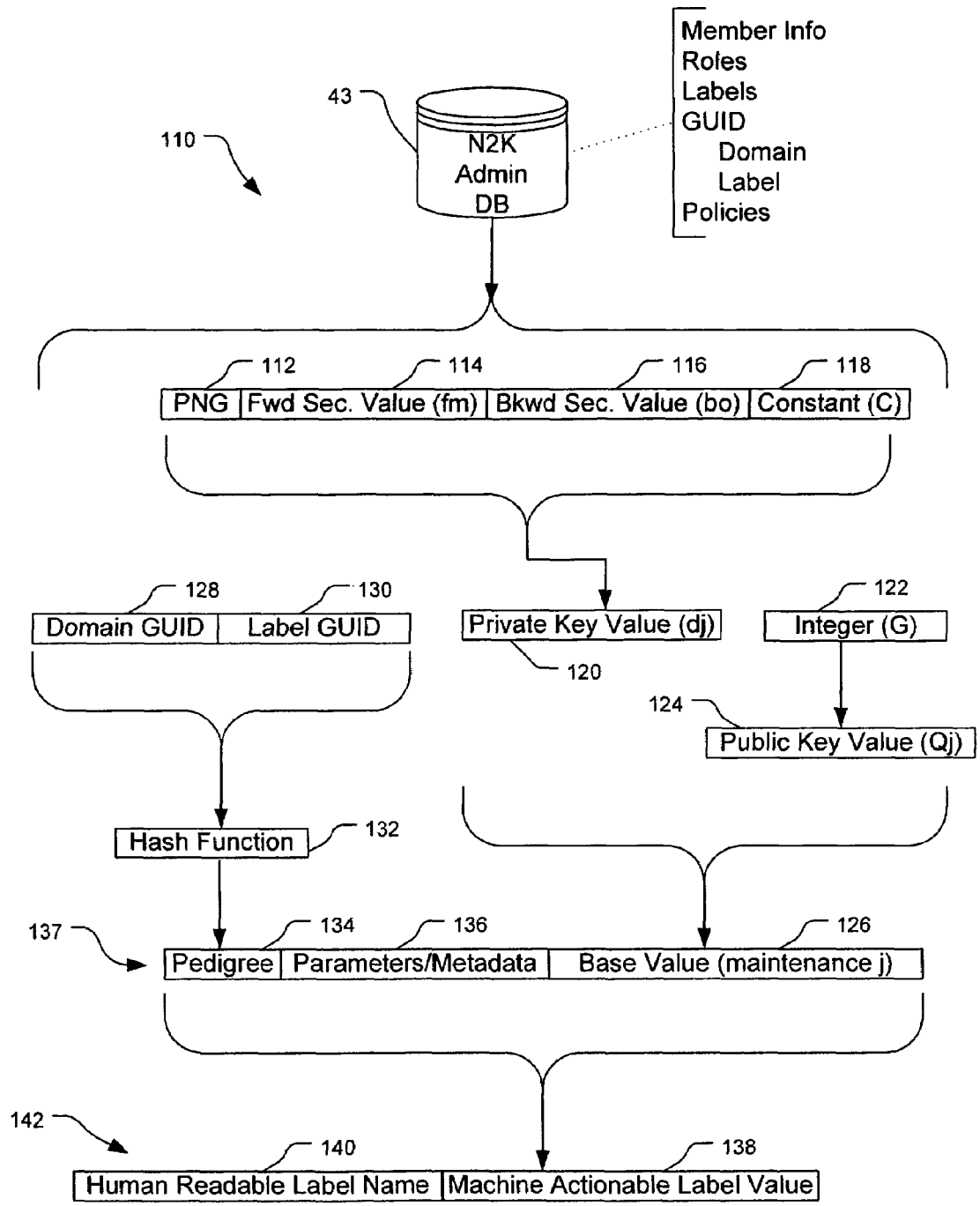
FIG. 5 is a block flow diagram of a process of producing a cryptographic label.

In operation, referring to FIG. 5, with further reference to FIG. 2, a process 110 for determining a label 142 using the server 41 and the administration database server 43 includes the stages shown. The process 110, however, is exemplary only and not limiting. The process 110 may be altered, e.g., by having stages added, removed, or rearranged. The label includes a named asymmetric key pair and can be distributed by the server 41 to entities for encryption and decryption of deks.

The label 142 includes a human-readable portion 140 for ease of use and identification by the user, and a machine-actionable portion 138 to provide access control to label recipients. Here, labels are used with an ephemeral Elliptic Curve key pair 120 (e.g., ephemeral elliptic curve Diffie-Hellman key pair) or 124 to generate shared values. The public key 124 corresponding to the label 142 is distributed to those members who will have write-only (W/O) access (i.e., the ability to encrypt, but not decrypt, objects) using that label 142. The private key 120 corresponding to the label 142 is distributed to those members who will have read-write (R/W) access (i.e., the ability to encrypt and decrypt an object) using that label 142. Since the public key 124 is derived from the private key 120, as discussed below, write access is implicitly given with read access.

The label 142 represents an indexed sequence of key values within a domain. Each value in the sequence represents a particular maintenance step of the label 142. When a label's key pair value changes, the next maintenance value is used. Maintenance values can be changed based on a variety of one or more criteria such as time of day, time since last change, number of uses of a key since the last change, etc. At any given time, preferably only the current maintenance value of the label 142 is used for encryption. Key pair values for any maintenance value can be recovered if the base values for that maintenance value are known.

Whether an entity can recover previous labels, and how far back, is determined by the server 41. Some members of the system 30 may be able to recover back to when they became members, while some all the way back to the first maintenance value, and some members may not be able to recover any previous label key values. Furthermore, this applies to each individual label within a specific member role.

Label Private Key Derivation

The label private key 120 for maintenance level j, $d_j$, is derived by using a pseudo-random number generator function 112 with base values 114, 116, 118 as seed material. The png function is, e.g., ANS X9.63, Annex A.4.1. There are three original, 512-bit, randomly generated, base values 114, 116, 118 that are used to derive the sequence of private keys 120 for a label. The base value 114 is called $f_m$ (the forward secrecy), the base value 116 is called $b_o$ (the backward secrecy), and the base value 118 is called C (the constant). There can be up to m maintenance values. Thus, the equation for $d_j$ is:

$$d_j = png(1, r, XKEY_j, XSEED_j)$$

where r is the order of the point for the chosen curve, B-571 or K-571. $XKEY_j$ and $XSEED_j$ are functions of $f_j$, the forward secrecy base value 114 for maintenance level j, $b_j$, the backward secrecy base value 116 for maintenance level j, and C, the constant base value 118.

$$XKEY_j = f_j + b_j$$

and $$XSEED_j = C + j$$

The formulae to calculate $f_j$ and $b_j$ are recursive in nature.

$$f_j = H(f_{j+1}) \_ f_{j+1}$$

and $$b_j = H(b_{j-1}) \_ b_{j-1} \qquad (2.5)$$

where H(x) is the SHA-512 hash of x. The derivation of the forward-secrecy base value for the first maintenance level involves a total of m hash operations.

The private key 120 is derived from the forward and backward base values 114, 116 and new private keys 120 are derived from hashes of the base values 114, 116. Initially, a fixed value for the number of key pairs to be produced from original base values 114, 116 is set (e.g., m=65,000). The forward and backward base values 114, 116 are hashed 65,000 times, and the $n^{th}$ backward base value ($b_n$) 116 is paired with the (m−n+1) forward base value ($f_{m-n+1}$) 114. The hashed base values 114, 116 are used to produce m private keys and m public keys.

Label Public Key Derivation

Elliptic curve public key points $Q_j$ 124 are derived from the base point 120 by multiplying by a private key integer 122 generated by the administration system 32.

$$Q_j = d_j G \qquad (2.6)$$

where $Q_j$ 124 is the label public key of maintenance level j, $d_j$ is the private key 120 for the label at maintenance level j, and G is the domain's base point 122.

The private key 120 and the public key 124 are combined to form a base value portion 126 of a label value 137. The label value 137 also includes various parameters/metadata 136 (e.g., the base value and curve for Elliptical Curve cryptography) and a pedigree 134. The pedigree 134 is the result of performing a one-way hashing function 132 on a domain globally unique identification (GUID) 128 and a label GUID 130. The domain GUID 128 uniquely identifies the domain for which the label 142 will be assigned. The label GUID is uniquely identified with the particular label 142 being produced. The pedigree 134 is securely bound to (associated with) the base value 136 of the label value 137. Using this technique, the pedigree can be proved for a label (i.e., it can be proved that a specific label came from a specific domain knowing the domain GUID and label GUID, although knowing the value of a pedigree 134 will not allow a determination of the domain).

The label 142 is formed by associating the human-readable name 140 with the machine-readable portion 138. Further, the label is associated with the label GUID 130 and is assigned a period (how often to change its value), preferably when the label 142 is produced. The label information is stored in the database server 43 and is retrievable by the server 41 for issuance to specific entities, e.g., the computers 40, 42, 44. The label 142 (or 137) can be stored, e.g., in a magnetic memory, on a CD-ROM, etc., and/or transmitted, e.g., as signals such as electric signals over a wire, electromagnetic waves wirelessly, optical signals, etc.

The server 41 controls the changing of the label 142. For example, the server 41 can change which label 142 is the current label 142 periodically (e.g., based on time or other measure), based on the occurrence of one or more events, etc. Preferably, the base value portion 126 of the label 137 includes an indication of the number of the label 142 in the sequence of labels 142.

The server 41 can provide information regarding the base values 114, 116 to a requesting member to enable the member to recover previous label values 137. For example, the server 41 can provide to a member a backward base value 116 corresponding to the "earliest" (e.g., in time, in sequence, etc.) label value 137 that the member is allowed to recover. The member can hash this value 116 and combine it with hashed forward base values 114 to determine the appropriate private key 120. The server 41 regulates which previous labels each member can recover (e.g., by storing indicia of what previous labels each member is allowed to recover and only providing information to recover labels that the particular member is allowed to recover). For example, the server 41 can control recovery of labels 142 to a particular time period, a particular date, back a particular number of maintenance values, etc.

Further, the server 41 can regulate what labels 142 a member is authorized to use going forward. The server 41 can control which cryptographic keys a member will be allowed to use. To regulate this, the server 41 provides the user with the $n^{th}$ hashed forward base value 114, thus allowing the member to produce forward base values 114 for keys up to the $n^{th}$ key 120. Thus, the server 41 can allow a member to use a label 142 up to a specified criterion (e.g., date, elapsed time, number of uses, etc.).

The server 41 can further limit members to labels values 137 within a "window" of values 137. By providing a member with both a hashed forward base value 114 and a hashed backward base value 116 other than their respective initial values, the server 41 limits the member to producing private keys 120 (and thus public keys 124) for maintenance values outside of the range corresponding to the two hashed base values 114, 116 provided. For example, for m=10,000, if the server 41 provides the $8001^{st}$ hashed forward value 114 and the $1,000^{th}$ hashed backward value 116, then the user can produce private and public keys 120, 124 for the range from the $1,000^{th}$ to the $2,000^{th}$ key pair (i.e., in the sequence of key pairs).

Label Splitting

Figure 6:
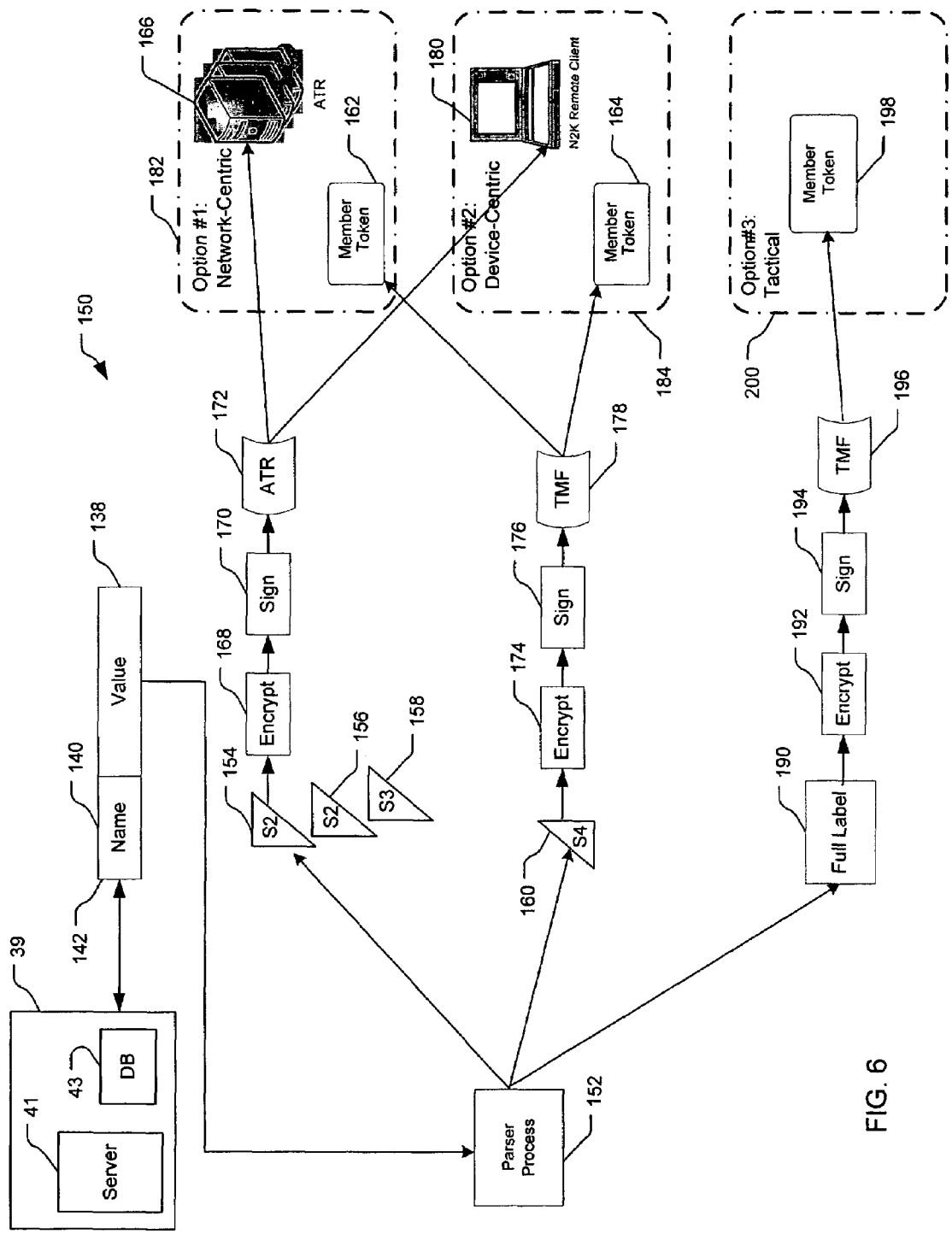
FIG. 6 is a block flow diagram of a process of producing and storing label splits.

Referring also to FIG. 6, the server 41 is further configured to divide the machine-actionable label values 138 for storage, and to recreate the label values for use, as shown by a process 150 that includes the stages and components shown. Thus, the encryption key 82 and the decryption key 98 (i.e., labels) that are provided at the origination space and at the destination space may be composed of several components, or splits, each of which may be provided by a different source. The process 150 is exemplary only and not limiting, e.g., as the process 150 may be altered, e.g., by having stages and/or components added, removed, or rearranged.

A secure parser process 152 is applied to the label 142 in a manner that uses an algorithm to divide the label 142 into multiple splits 154, 156, 158, 160 so that any single split does not maintain any intelligible information by itself. Each split 154, 156, 158, 160, by itself, is non-functional (e.g., a benign key), so that the splits 154, 156, 158, 160 are useless for indicating a key unless they are recombined using the parser process 152 with the corresponding splits 154, 156, 158, 160.

Using an "M" of "N" splitting algorithm in the parser 152, e.g., a 2 of 4 split, a domain member can recombine its member label split 160 with any one of the other three corresponding splits 154, 156, 158 to obtain the usable full label 142. The member's token split 160 can be designated as a mandatory piece, where a stored member token 162 or 164 must be re-combined with any of the other splits 154, 156, 158 to regenerate the usable full label 142. Recombining the other splits 154, 156, 158 without the member's mandatory split 160 will not enable the parser process 152 to recombine the label splits 154, 156, 158 in a usable manner.

Federated Abridged Token Repositories (ATRs) 166 and/or 180 are employed as warehouses of the parsed member label splits 154, 156, 158. The administrative system server 41 produces an organization by defining a set of servers/devices referred to as an Abridged Token Repository (ATR) cluster 166. This ATR cluster 166 stores the parsed label splits 154, 156, 158. This ATR cluster 166 may be designated as required servers or simply available servers for the corresponding domain. If the ATR cluster 166 is listed as required, then the servers in the cluster 166 are assigned (e.g., automatically) to all labels created within the domain. If the ATR cluster 166 reflects availability, then a domain security officer may assign any specified servers to the label 142, e.g., when the label 142 is produced. The ATRs can be stored, e.g., on various servers throughout the system 30, at a designated URL site for Internet connectivity, and/or on various devices such as laptop or desktop computers, personal digital assistants (PDAs), software programmable radios, field-programmable gate arrays (FPGAs), etc.

For the ATR splits 154, 156 and/or 158, once the label 142 is split by the parser algorithm 152, each split 154, 156, 158 is individually encrypted 168 with the public encryption key 124 for a particular domain member, signed 170 with an organizational digital certificate and pushed out to a specific ATR device in the cluster 166 and/or 180, here (although not required) via an ATR service 172. Thus, the splits 154, 156, 158 are unique to a domain member, even if the label 142 is provided to multiple members. This process is applied for each ATR split label 154, 156, and/or 158 that was produced by the "M" of "N" parser function 152. Likewise, the Token Maintenance File (TMF) split 160 is produced by the parser process 152. The TMF split 160 is encrypted 174 with the member's public encryption key (e.g., that is identity based and unique to the member), signed 176 with an organizational digital certificate, and pushed out to a specific TMF service, here via a TMF service 178. Thus, the split 160 is unique to a domain member, even if the label 142 is provided to multiple members. The encrypted splits 154, 156, 158, 160 remain protected until they are received by a Key Protection Module (KPM), described below, for the member with the corresponding private key to decrypt the label splits 154, 156, 158, 160.

The server 41 is responsible for role and label distribution to domain members. In accordance with a role assigned to a member, e.g., by an Organization Unit Authority, each label 142 associated with the role is parsed and packaged as a Token Maintenance File (TMF) that is distributed to the member's token 162 and/or 164 and also to the label's corresponding ATR servers 166 and/or 180. If the occasion for distribution is a maintenance release, then TMFs are preferably produced and distributed automatically for all members who possess the label 142 and for the appropriate ATR servers 166, 180. An ATR may reside on a network for a Net-Centric environment 182, with potentially multiple ATR servers 166 employed, or the ATR server 180 might be a device such as a laptop, PDA or some other computing device for a Device-Centric environment 184. In either case, benign ATR splits 154, 156, 158 are pushed out to the ATR device 166 and/or 180 for storage. The member's split 160 is recombined using the parser algorithm 152 with its corresponding ATR split 154, 156, 158 in order to be usable for encryption and/or decryption purposes depending upon whether the key pair generated is the public (write-only) key pair or the private (read/write) key pair, respectively.

The administration system 32 may establish a policy that will allow for specific label(s) 142 to be distributed without using the parser process 152. In this case, a full label 190 is encrypted 192 with the member's public encryption key, signed 194 with an organizational digital certificate (21) and then pushed out, here with a specific TMF service 196 and stored on a member's token 198. The non-split label 190 is preferably used for a tactical environment only. Based on a desired policy, the label 142 can be distributed to specific members via either split labels 154, 156, 158, 160 or a full label 190. Issuing the full label 190 to members carries corresponding issues with respect to updates and revocations.

Dynamic Updates and Revocation

The system 30 can dynamically update member privileges and/or revoke member access altogether. Revocation prevents access to material encrypted subsequent to revocation, while allowing access to material encrypted during a member's period of legitimate access. Once the decision to revoke is made, new encryption/decryption access denial should be as complete and rapid as security risks warrant.

To revoke a member's privileges, e.g., because a token is determined to be compromised and/or invalid, the administration system 32 removes (revokes) the components of the member's token that are on the ATRs 166 and 180 (preferably every ATR on which member splits are stored). Through the use of splitting the label 142 and storing one split 154, 156, 158 on the ATR 166 and the other split 160 on the member's token 162, revocation is substantially immediate, whether the member's token 162 is ever updated or not. Preferably, other administrators can temporarily suspend a member's privileges, but only the Enrollment Officer (EO) can revoke them. The system 30 provides replication and synchronization of federated ATRs 166.

The TMF service 178 distributes updates to the member token 162. Depending upon the security requirements and implementation, updates can be provided to the member's token 162 when the member logs on to the token, at which time the server 41 (in particular the KPM described below) automatically looks for an update at the designated TMF service location. If updates are found, the member's token 162 is automatically updated. Other than the member performing the log on, this process is preferably fully transparent to the member.

Alternatively, updates can be pushed to member tokens so that the system 30 automatically performs periodic searches for updates from the TMF service 178 or to produce interrupts that could notify the member's token 162 of an update. A notification may or may not be displayed to the member.

Figure 7:
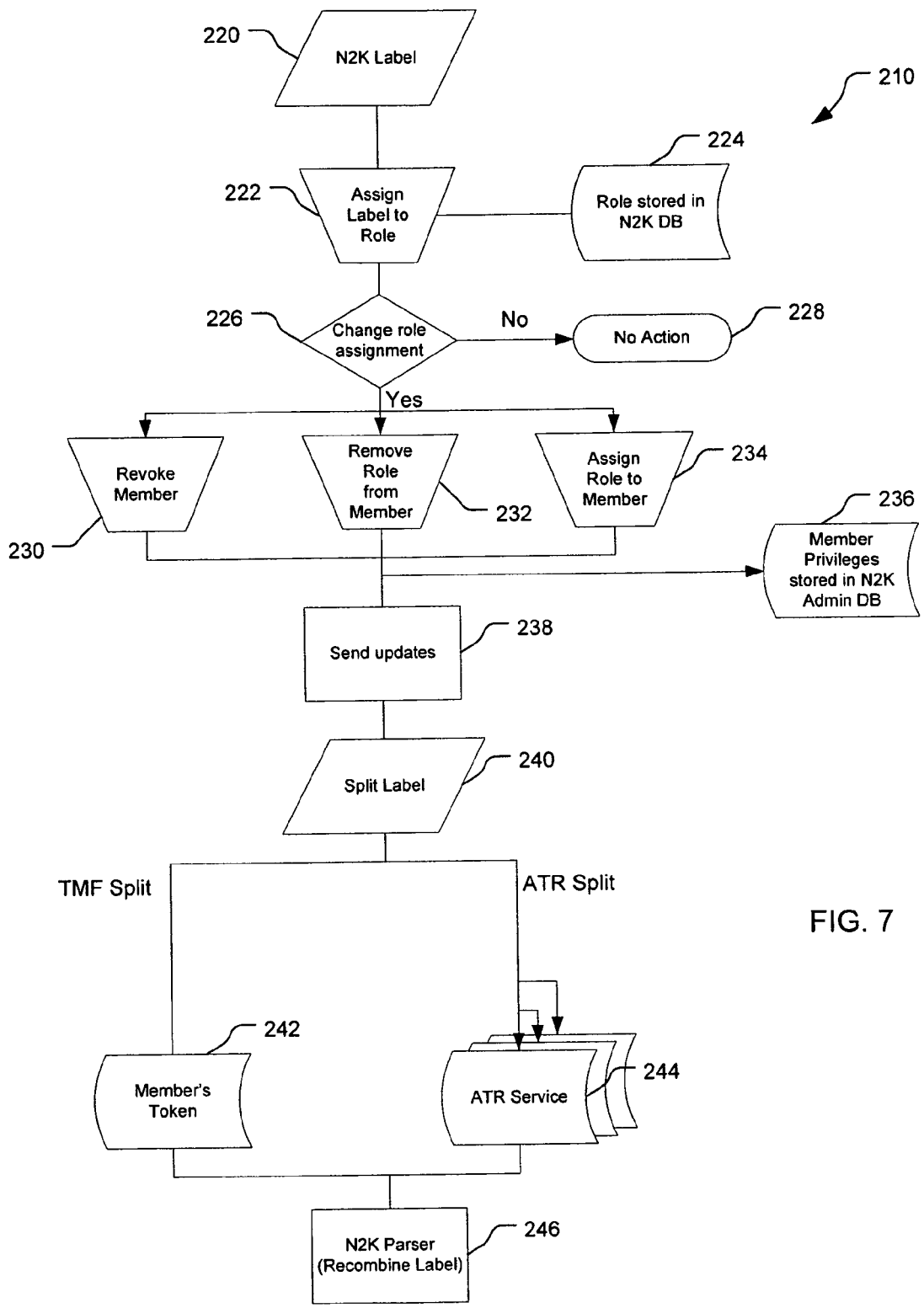
FIG. 7 is a block flow diagram of a process of dynamically updating and revoking access privileges.

Referring also to FIG. 7, a process 210 for dynamically updating/revoking member privileges includes the stages shown. The process 210, however, is exemplary only and not limiting. The process 210 may be altered, e.g., by having stages added, removed, or rearranged. At stage 220, the label 142 is produced by the administration system 32 as described above with respect to FIG. 5. At stages 222, 224 the label 142 is assigned to a role and stored in the database server 43. The role is made available to the administration system 32 to decide, at stage 226, whether to change a role assignment for a member. The administration system 32 may decide to revoke member privileges at stage 230, remove a role from a member at stage 232, or assign a new role to a member at stage 234. If the administrator determines that no role change is in order, then the process 210 terminates at stage 228.

If it is decided to assign a new role to a member, the administration system 32 assigns the new role at stage 234. The database server 43 is updated at stage 236 and the new label 142 is sent at stage 238 to a security module of the administration system 32 to split the label 142 at stage 240 as described above with respect to FIG. 6. The TMF split 160 is processed and sent electronically to the member's token 162 at stage 242 to update the token with the new split. Likewise, the ATR split(s) 154, 156, 158 is(are) sent to one or more ATR devices 166 at stage 244 for storage. Depending upon the deployment requirements, there may only be one ATR device in the cluster 166 or there may be multiple ATR devices providing redundancy and failover, e.g., in case one ATR device is non-functional. At stage 246, the parser 152 is used to retrieve the member's token split from its token 162 and the ATR split 154, 156, 158 from the ATR 166 to recombine the label 142 for use.

The administration system 32 at stage 226 may decide to revoke and/or to remove a role from a specific member. The system 30 may perform these functions immediately and may do so with or without direct access to the member's token 162. Similar to updating member privileges, the database server 43 is updated at stage 236 and an update is sent at stage 238 to a business tier portion of the server 41. At stage 240, the label is split into null values, or the splitting may be bypassed, with null values resulting for the TMF and ATR splits 154, 156, 158, 160. The splits 154, 156, 158 are sent out with "null" values, effectively removing the split from the respective service. A null TMF split is sent to the member's token 162 as an update and stored at stage 242. Thus, the TMF split is removed from the member's token 162. In the event administration system 32 decides at stage 230 to revoke the member from the system 30, the TMF token is removed from the member's token 162 at stage 242. An update is also processed and a "null" ATR split 154, 156, 158 is sent out to (preferably all) ATR services to which the member is assigned. This effectively updates the member's privileges whether the member receives the TMF split to its token or not. This results because the parser 152 must receive both the member token split 160 along with the ATR split 154, 156, 158 in order to recombine the label 142 for use. "Vaccine" technology can be employed to provide protection against storing and replay attacks and otherwise manipulating the parser function at stage 246 in order to recombine the labels 142 for which the member is no longer authorized. Vaccine provides kernel level protection, intercepting system level calls by the operating system to help ensure that only the N2K encryption application will be able to perform specific procedure calls and access the memory space 50.

Sensitivity Labels:

The system 30 uses sensitivity levels to control how data are handled. For example, the sensitivity level can dictate the cryptographic strength of the encryption algorithm, the type of identification and authentication (I&A) used for a member to gain access to data, the quality of a random number generator used for encryption, integrity requirements (e.g., digital signatures and time stamps), etc. Sensitivity labels, indicative of sensitivity levels, reside in the organization-wide domain—one label is assigned per sensitivity level. The administration system 32 assigns sensitivity levels to members. The member receives the Read/Write sensitivity label for each assigned sensitivity level. Write-Only sensitivity labels are potentially available to all members in an organization. As shown in FIG. 6, sensitivity labels, as are all labels 142 assigned to a member, are split and stored on the member's token 162 and on one or more corresponding ATRs 166.

Figure 8:
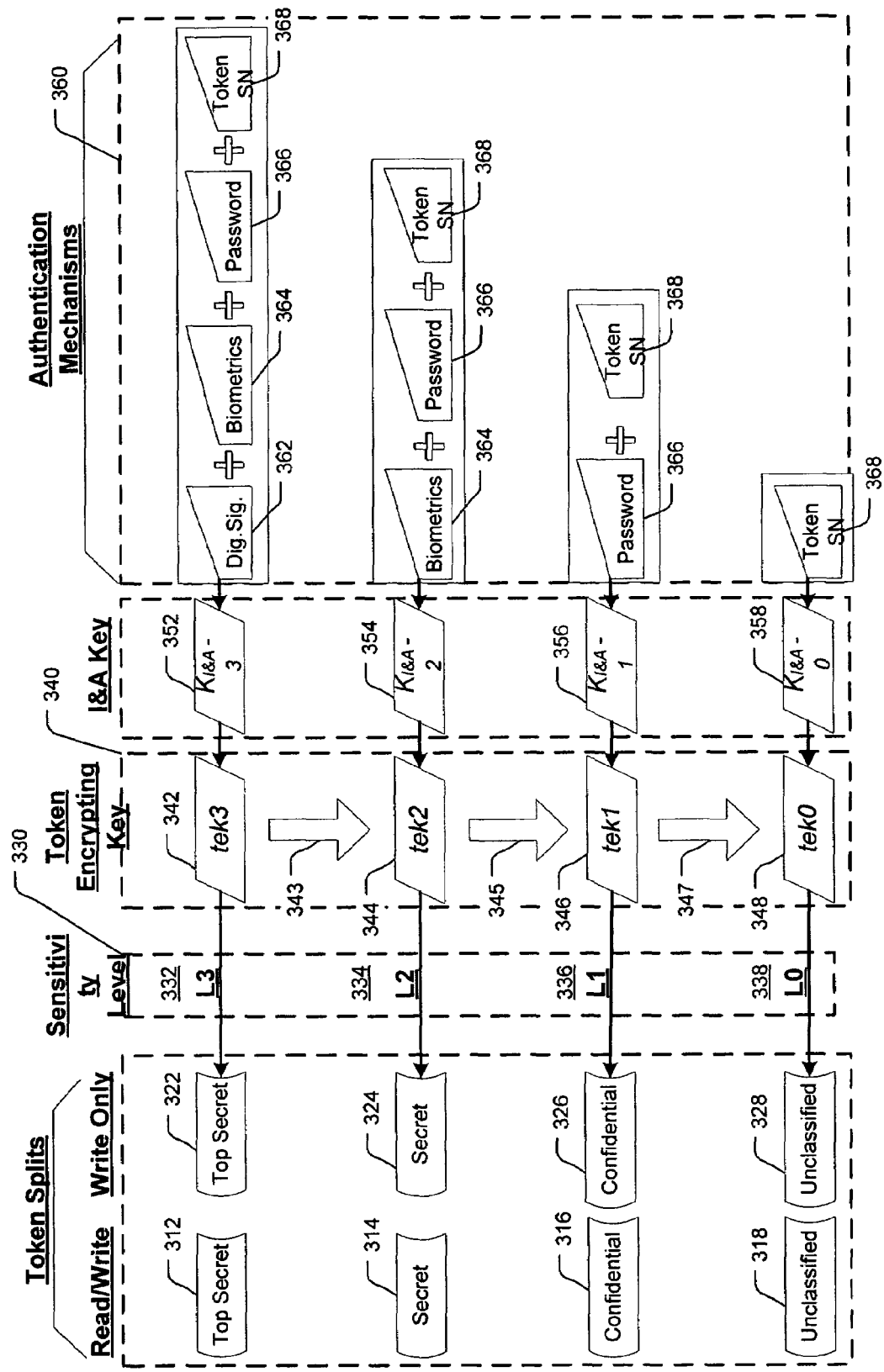
FIG. 8 is a block diagram illustrating sensitivity levels and access and authentication for the levels.

Referring to FIG. 8, each Read/Write (R/W) key pair 312, 314, 316, 318 is protected with a corresponding token encryption key (tek) 342, 344, 346, 348. The tek 342 for encrypting the sensitivity label R/W key pair 312 at the highest sensitivity level (e.g., for a top secret sensitivity level 332) is generated randomly. The other teks 344, 346, 348 for the other levels 334, 336, 338 are derived from the top tek 342 by using a cryptographic one-way function 343, 345, 347. This gives the member read-down capability yet not read-up capability. The member, however, may be able to write to higher sensitivity levels (write-up capability). The administration system 32 can implement a variety of policies, e.g., (1) allowing the member access only to the sensitivity level associated with the member (and for which the member authenticates), (2) allowing a member to read at the member's level and levels below (of lesser sensitivity) the member's level, and/or (3) allowing the member to write to any level, regardless (independent) of the member's level. The teks 342, 344, 346, 348 themselves are further encrypted on the token with a key that is derived from an I&A process associated with the corresponding level L3 (332), L2 (334), L1 (336), L0 (338). Thus, members can login at level Lx and use corresponding R/W sensitivity labels 312, 314, 316, 318 at any level Ly where y≦x.

Sensitivity label Write-Only (W/O) key pairs 322, 324, 326, 328 are stored with the category labels at the lowest sensitivity level L0 (338), protected with tek0 348. A sensitivity label's public and private keys are generated the same as "category" labels. Sensitivity labels are special purpose labels that provide an indication of relative value and category labels are standard labels that are grouped according to category.

During encryption, if sensitivity labels are used within an organization, one sensitivity label is used. This is combined with other category labels as the encrypting member, or the application, intends. More information is provided below with respect to combining labels.

Configurable I&A:

Member identification processes are based upon one or more different types of factors: Knowledge based factors (e.g., PIN or Password), possession factors (e.g., token), and/or biometrics factors. The administration system 32 supports multiple factors of identification and authentication mechanisms such as strong password, various biometrics types (e.g., fingerprint, facial recognition, etc.) as well as various types of tokens, digital signatures, etc. The administration system 32 can select I&A sensitivity levels 330 for domestic organizations. Each I&A sensitivity level 332, 334, 336, 338 has one or more of the I&A factors associated with that level 332, 334, 336, 338. A different tek value 340 is used for each sensitivity level 330. The tek value 340 for a specific sensitivity level 330 is generated by employing a one-way hash function of the tek value 340 for the sensitivity level 330 directly higher in the sensitivity level hierarchy than the one being generated.

A user identification process that uses multiple authentication factors 360 is used to combine strengths of factors while preferably avoiding weaknesses of the factors 360. The user identification process is configured to implement multiple variations of factor combinations to provide different access requirements. The access requirements implemented by the administration system 32 described here are exemplary only and not limiting. For the unclassified level 338, access is available using a token 368 as the authentication mechanism 360. The member logs into (authenticates himself/herself) the token using the token 368 and the $K_{1\&A}0$ key 358 is generated. The $K_{1\&A}0$ key 358 is used to unwrap (decrypt) tek0 348 which is used to decrypt the "unclassified" key pairs 318, 328. Access to confidential level 336 read/write key pair 316 and write-only key pair 326 is available using the token 368 and a password 366 as authentication mechanisms 360. The member logs into the token using the token 368 and the password 366 and the $K_{1\&A}1$ key 356 is generated. The $K_{1\&A}1$ key 356 is used to unwrap tek1 346, which is used to decrypt the "confidential" key pairs 316, 326. Access to the secret level 324 read/write key pair 314 and the write-only key pair 324 is available using the token 368, the password 366, and biometrics 364 authentication mechanisms 360. The member logs into the token using the token 368, the password 366, and the biometrics 364 and the $K_{1\&A}2$ key 354 is generated. The $K_{1\&A}2$ key 354 is used to unwrap tek2 344, which is used to decrypt the "secret" key pairs 314, 324. Access to the top secret level 332 read/write key pair 312 and the write-only key pair 322 is available using the token 368, the password 366, the biometrics 364, and digital signature 362 authentication mechanisms 360. The member logs into the token using the token 368, the password 366, the biometrics 364, and the digital signature 362 and the $K_{1\&A}3$ key 352 is generated. The $K_{1\&A}2$ key 352 is used to unwrap tek3 342, which is used to decrypt the "top secret" key pairs 312, 322. The names (top secret, secret, confidential, and unclassified) given to the sensitivity levels 330 are exemplary only and not limiting.

If the member logs in to the top sensitivity level L3 (332), using the appropriate authentication mechanisms 360 associated with that level 332, then the $K_{1A}3$ key 352 is generated, and the administration system 32 automatically performs the one-way hash function 343, 345, 347 to unwrap the lower levels L2-L0 334, 336, 338. If a user logs in at sensitivity level L1 (336), however, the $K_{1A}1$ key 356 is generated, allowing access to levels L1 (336) and L0 (338), while they will inhibiting reading at levels L2 (334) and/or L3 (332).

Combining Labels

The system 30 can combine labels in order to refine the access control placed on encrypted data. Labels may be combined with the logical "AND" and/or "OR" operators. If labels are combined with the logical "AND" operator during encryption, the encrypted data can be decrypted by a recipient that possesses read access for the labels that were combined. If labels are combined with the logical "OR" operator during encryption, the encrypted data can be decrypted by a recipient that possesses read access for any one of the combined labels.

In general, combining labels with logical "AND" decreases the readership of the encrypted data while combining labels with logical "OR" increases the readership. Both operators in combination are allowed in accordance with the invention, giving flexibility in tailoring access control to encrypted data.

Both of these techniques can be used to apply a sort of Boolean logic to access control. It is similar to conjunctive normal form (CNF). Labels in a group are combined with "OR," and each of these groups is combined with "AND."

Disjunctive Label Sets

The member (or the application) chooses a combining logic for the selected set of encryption labels. This logic resembles disjunctive normal form (DNF). A disjunctive label set comprises a group of labels, each of which is separated with logical "OR". The form of the member defined logic looks like:

$$(L_{1,1}) \wedge (L_{2,1} \vee L_{2,2} \vee \ldots) \wedge (L_{3,1} \vee L_{3,2} \vee \ldots) \ldots$$

where $L_{1,1}$ represents a sensitivity label (only one is allowed) and $L_{i,j}$ represents the $j^{th}$ label in the $i^{th}$ disjunctive label set. The $\wedge$ symbol represents AND and the $\vee$ symbol represents OR.

For the chosen set of labels, let d represent the number of disjunctive label sets and $i_{max}$ is the number of labels within the ith disjunctive label set. A single disjunctive label set is represented as: $(L_{i,1}\_L_{i,2}\_ \ldots L_{i,imax})$.

The whole chosen set in DNF type notation is then:

$$\bigwedge_{i=1}^{d} \bigvee_{j=1}^{i_{max}} L_{i,j}$$

Conjunctive Label Sets

For the system 30 to use this logic, it is transformed into a conjunctive normal form (CNF) type of sentence of the form:

$$(L_{1,1} \wedge L_{2,1} \wedge L_{3,1} \wedge \ldots)\_(L_{1,1} \wedge L_{2,1} \wedge L_{3,2} \wedge \ldots) \ldots$$

In this form a set of d labels within parentheses are combined with the logical AND operator. Such a set is called a conjunctive label set (CLS).

The general form of the CNF is:

$$\bigvee_{k=1}^{c} \bigwedge_{i=1}^{d} L_{i,j}$$

where c is the total number of derived CLSs and j is a function of the indices i and k.

The value of c is the number of labels in each original disjunctive label set multiplied together. Each of the derived CLSs is used to calculate a different key encryption key (kek) and therefore the data encryption key will be wrapped c times.

$$c = \prod_{i}^{m} i_{max}$$

The index j varies so that all permutations of (i, j) are enumerated. One way to show this mathematically is $$j = \left\lfloor k \left( \mathrm{mod} \prod_{i=j}^{d} i_{max} \right) \right\rfloor.$$

where k is the index on the disjunction in the equation for c. The following illustrates an example of transforming user input, in DNF, into a set that the system 30 can use in CLS form.

User Input in Disjunctive Normal Form:

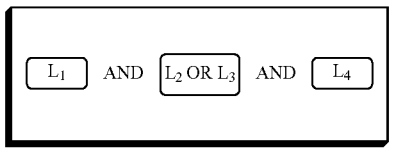

Is Equivalent to the Conjunctive Normal Form:

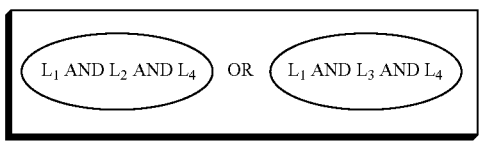

Conjunctive Label Set (CLS) 1

Conjunctive Label Set (CLS) 2

Each CLS is used to derive a wrapping key.
Each label in a CLS is used to calculate a shared value.
The shared values for labels within a CLS are input to the key derivation function to derive the wrapping key corresponding to the CLS.

Key Protection Module

As discussed above, labels can be combined to derive a key to "wrap" (e.g., encrypt) the data encryption key (DeK), with the key to wrap the DeK being unique to each conjunctive label set. If a member of data encrypted by the system 30 has the private key pairs corresponding to labels used in one of the conjunctive label sets, then that member is able to unwrap the Data Encryption Key and re-generate original plaintext data.

Figure 9:
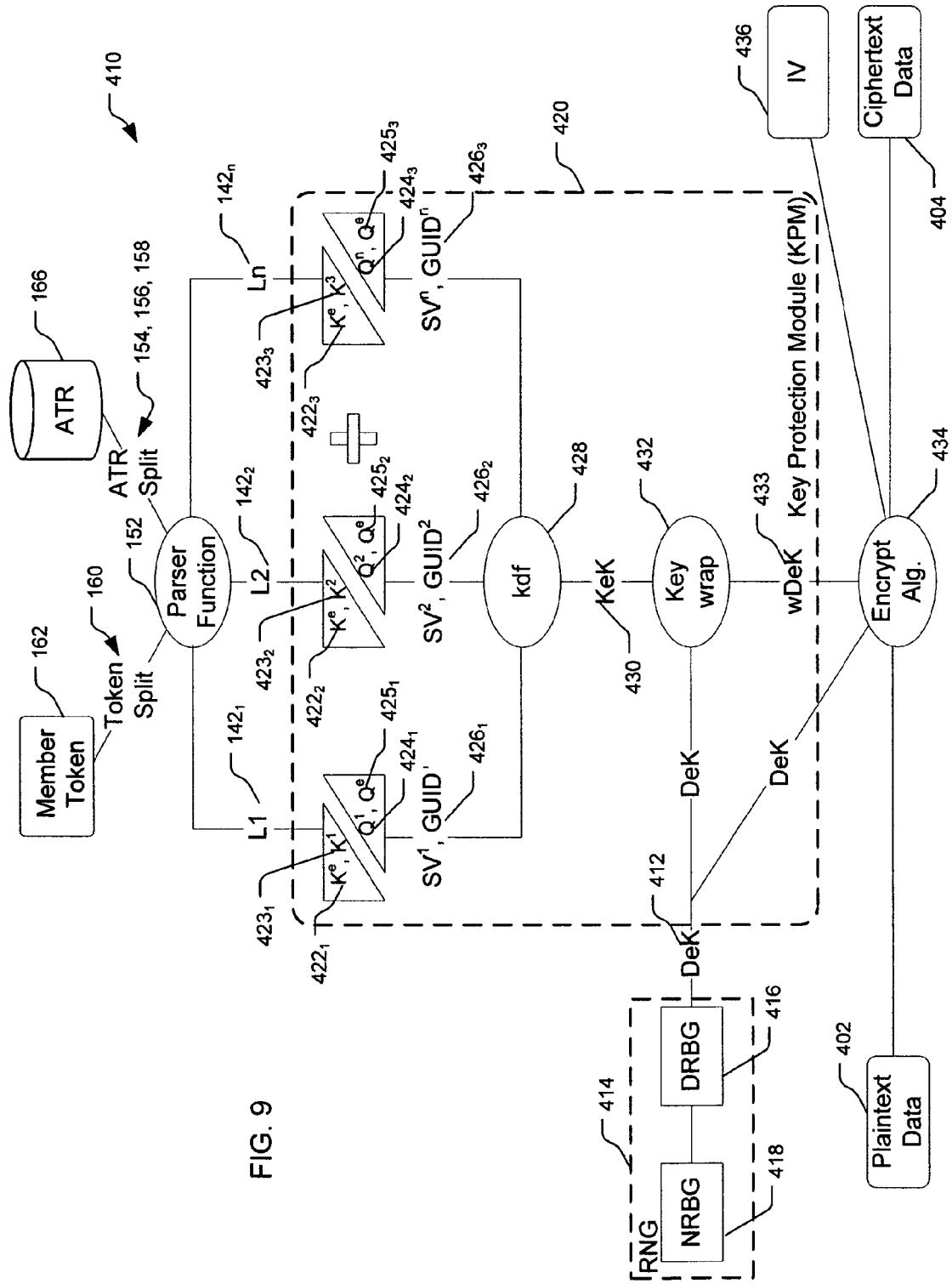
FIG. 9 is a block flow diagram of a process of producing a key encrypting key and encrypting a data encryption (working) key using the key encrypting key.

Referring to FIG. 9, a process 410 for generating a Key Encrypting Key (KeK) 430, that is used to protect the Data Encrypting Key (DeK) 412, that, in turn, is used to encrypt the plaintext data 402 includes the stages and components shown. The process 410, however, is exemplary only and not limiting. The process 410 may be altered, e.g., by having stages and/or components added, removed, or rearranged.

Generating a Data Encryption Key (DeK):

In FIG. 9, the DeK 412 is a random value generated directly from a random number generator (RNG) 414 that here includes a deterministic random bit generator (DRBG) 416 that is seeded from a non-deterministic random bit generator (NRBG) 418. Generally, the DRBG 416 specified in ANS X9.63, Annex A.4.1 is used to generate random values for the system 30. The system 30, however, can use a DeK 412 from other sources. The system 30 can incorporate its own RNG 414, or using an RNG API, the DeK 412 can be from an external RNG source 414, or an agency/organization can provide the DeK 412, etc. RNGs of differing quality can be used based upon the environment in which the N2K technology is embedded.

Re-Combining Label Splits:

The public-key portions of the benign label splits (see FIG. 6 and related discussion), i.e., the member token split 160 and the ATR split 154, 156, 158 are "re-combined" in order for them to be used in the Key Protection Module (KPM) 420. The KPM includes: asymmetric and symmetric algorithms, with the asymmetric algorithms providing read/write data separation and RBAC through a labeling scheme; a key derivation process that provides a standards-based implementation of protecting symmetric keys; support for multiple symmetric algorithms (e.g., block or stream cipher) used to encrypt/decrypt data objects; support for multiple domains of users, and; support for server-client, client-device, and client-only implementations. The label splits are stored on the member token 162 and the ATR 166. The member's token split 160 is retrieved from the member's token 162 along with the corresponding ATR split 154, 156, 158 from the ATR cluster 166. Both the member split 160 and the corresponding ATR split 154, 156, 158 are provided to the parser algorithm 152 to be recombined to generate the full label 142. Note, that any member may have more than one label 142 (here n labels) that are to be re-combined by the parser process 152. The re-combining is repeated for each label 142 that the member has access to that is being used in the Conjunctive Label Set.

Generating Shared Values:

During encryption, a set of labels 142 is chosen. For each label 142 chosen, a shared value 148 is calculated. Using the example of a single label 142, this is accomplished by multiplying the label's public key (Q) 424 by the ephemeral private key (k) 422. The shared value 426 is the x-component of the resulting Elliptic Curve (EC) point. This is the method of ANS X9.63, Section 5.4.1.

$$Z_j = d_e Q_j$$

$$SV_j = x z_j$$

where $Z_j$ is the calculated point, $Q_j$ is the public key 146, and $SV_j$ 426 is the shared value, all corresponding to the $j_{th}$ label 142, de is the ephemeral private key integer 422 and $xz_j$ is the x-component of $Z_j$. This process is repeated for each label 142 that is selected for a Conjunctive Label Set for encrypting the plaintext message 402. In other words, a unique shared value 426 is generated for each label 142 in FIG. 9.

Regenerating Shared Values

For decryption, the shared values 426 are regenerated. The label's private key 423 and an ephemeral public key 425 are multiplied together. The shared value 426 is the x-component of the resulting EC point.

$$Z_j = d_j Q_e$$

$$SV_j = x z_j$$

where Zj is the calculated point, dj is the private key 423, and SVj is the shared value 426, all corresponding to the jth label, Qe is the ephemeral public key point 425 and xZj is the x-component of Zj. This process is repeated for each label 142 that is selected for decrypting a ciphertext message 404. In other words, a unique shared value is generated for each label 142 in FIG. 9.

Deriving the Key Encryption Key

A key encryption key (KeK) 430 is derived for each conjunctive label set 142. The shared values 426 along with the GUIDs of the labels 142 in the set are employed to derive the KeK 430.

$$kek = kdf(Z, SharedInfo)$$

where kdf 428 represents the key derivation function of ANS X9.63, Section 5.6.3, using the SHA-512 hash function. The size of the kek1, is 256 bits and $$Z = xz_1 k x z_2 k \ldots k x z_d$$

where xZj is the shared value 426 corresponding to the jth label 142 in the conjunctive set and k is concatenation. The SharedInfo bit string (that provides the label ID and the order in which to process the labels) is $$SharedInfo = L_1 k L_2 k \ldots k L_d$$

where Lj represents the label id (a globally unique identifier or GUID) for the jth label 142. The shared values 426 and label IDs in these two equations are in increasing order by label ID. Through this process, a unique KeK 430 is generated for each conjunctive label set selected for the encryption 434 of the plaintext message 402. In other words, if two different conjunctive label sets are selected by the system 30, two different KeKs 430 will be generated. If three are selected, three KeKs 430 will be generated.

For decryption of the ciphertext message 404, the member accesses the labels 142 corresponding to any one of the conjunctive label sets used to generate one of the KeKs 430 that were used to encrypt the original plaintext message 402

Wrapping the Data Encryption Key

The DeK 412 is encrypted using a key wrap function 432 once with each KeK 430 for each conjunctive label set. For decryption, a member uses a private key for each label 142 in any one of the conjunctive label sets. Therefore, the user can decrypt using the wrapped data encryption key 412.

$$wKi = W_{keki}(K)$$

where wKi is the data encryption key 412 wrapped with the ith KeK 430, Wkeki is a key wrapping function 432, here the National Institute of Standards and Technology (NIST) Advanced Encryption Standard (AES) key wrapping function, applied to the DeK 412 using key the KeKi 430, and i=1 to c. Similarly, $$K = U_{keki}(wKi) \quad (4.7)$$

for unwrapping a wrapped key, where Ukeki is a key unwrap function 432, here the NIST AES key unwrap function, of wKi 433 using the key KeKi 430. A wrapped DeK, WDeK, 433 is provided to the encryption algorithm 434 and is included in association with (e.g., in a header) the encrypted plaintext data and thus provided as part of the ciphertext 404. The WKeK 433 can be unwrapped and used to unwrap the DeK 412 and thus the ciphertext 404 to yield the plaintext 402.

Encryption Process Using the Key Protection Module

Referring to FIGS. 4, 6, and 9 the following stages provide the procedures performed to sign and encrypt data within the client runtime environment of the system 30. This process flow is exemplary only, and not limiting.

1. A user (or an application) chooses a symmetric key algorithm 434 to encrypt the plaintext message 402. The DeK 412 can be provided by any source, typically the RNG 414, to be used by the algorithm 434. A variety of symmetric algorithms can be used as the algorithm 434.

2. A member is provided access to labels 142, e.g., $142_1$, $142_2$, and $142_n$, that are recombined by the parser function 152. Member token label splits 160 are retrieved from the member's token 162 while ATR label splits 154, 156, 158 are retrieved from the corresponding ATR 166.

3. The member (or application) chooses a set of labels 142. The member uses disjunctive normal form (DNF) to combine the labels 142. Labels 142 for which the public keys are accessible by the member are available for encryption.

4. Based on the labels 142 chosen by the member (or application) and the combining logic, the labels 142 are re-grouped into conjunctive label sets. If a foreign key (a public key pair from an imported label as discussed below) is used, then the shadow label (a label assigned within the member's (domestic) organization associated with the imported label) will be "ORed" with the set of labels 142 selected before generating the conjunctive label sets.

5. A suitable symmetric data encryption key 412 and an initialization vector 436 are generated randomly from the RNG 414. These may be generated from the same RNG 414, or different RNGs 414 depending upon the security requirements of the system 30.

6. Ephemeral private keys, $K^e$, 422 corresponding to each separate domain spanned by the chosen label set are generated.

7. Public keys 424 are calculated for each ephemeral private key 422.

8. A shared value 426 for each label 142 is calculated.

9. A Key Encryption Key 430 is derived using the key derivation function 428 for each conjunction from the shared values 426 corresponding to the labels 142 within the conjunction.

10. A DeK 412 received from the RNG 414 is wrapped with a KeK 430 using the key wrap function 432 for each conjunctive label set producing a WDeK 433.

11. The plaintext message 402 is digitally signed using the user's private signing key.

12. The plaintext data 402 is encrypted with the chosen algorithm 434 using the DeK 412 and the initialization vector 436 to produce the ciphertext message 404.

13. The ciphertext message 404, digital signature and metadata are "packaged" (associated with each other) using a secure hashing function.

14. The "package" is signed a second time with the user's private key.

Decryption

For decryption, a similar, but not identical, process is followed. The ciphertext 404 is received at a destination. The KeK 430 is reproduced using the private key portion 423 of all the labels corresponding to the public portions 422 used to encrypt the plaintext 402. If multiple KeKs 430 are used to encrypt the plaintext 402, then any of the KeKs 430 may be regenerated to decrypt the plaintext 402, with the KeKs 430 being formed using one or more labels. The DeK 412 is unwrapped by the key wrap function module 432 using the KeK 430. The ciphertext 404 is decrypted by a decryption algorithm corresponding to the encryption algorithm 434 using the DeK 430.

Cross-Domain Cryptographic Key Management for Coalition Information Sharing

Embodiments of the invention provide a variety of features for techniques for sharing labels. The system 30 includes a centralized web/server-based administration system that can update individual members upon "logon" and/or through the implementation of interrupts to provide notice to perform an update. The centralized administration system uses an algorithm based split-key, "parser" 152, capability to provide near real-time revocation and access privilege updates. A centralized token repository is provided and further uses federated ATR servers 166 such that there is no single point of failure. The system 30 can produce multiple domains within an organization, import/export labels with other (e.g., foreign) organizations, and/or produce coalition domains with multiple organizations (e.g., coalition partners). This may be accomplished without invoking additional management overhead on the partners participating in the coalition. The invention can be integrated with existing key management infrastructure to provide RBAC technology to provide secure cross-domain information sharing capability.

Figure 10:
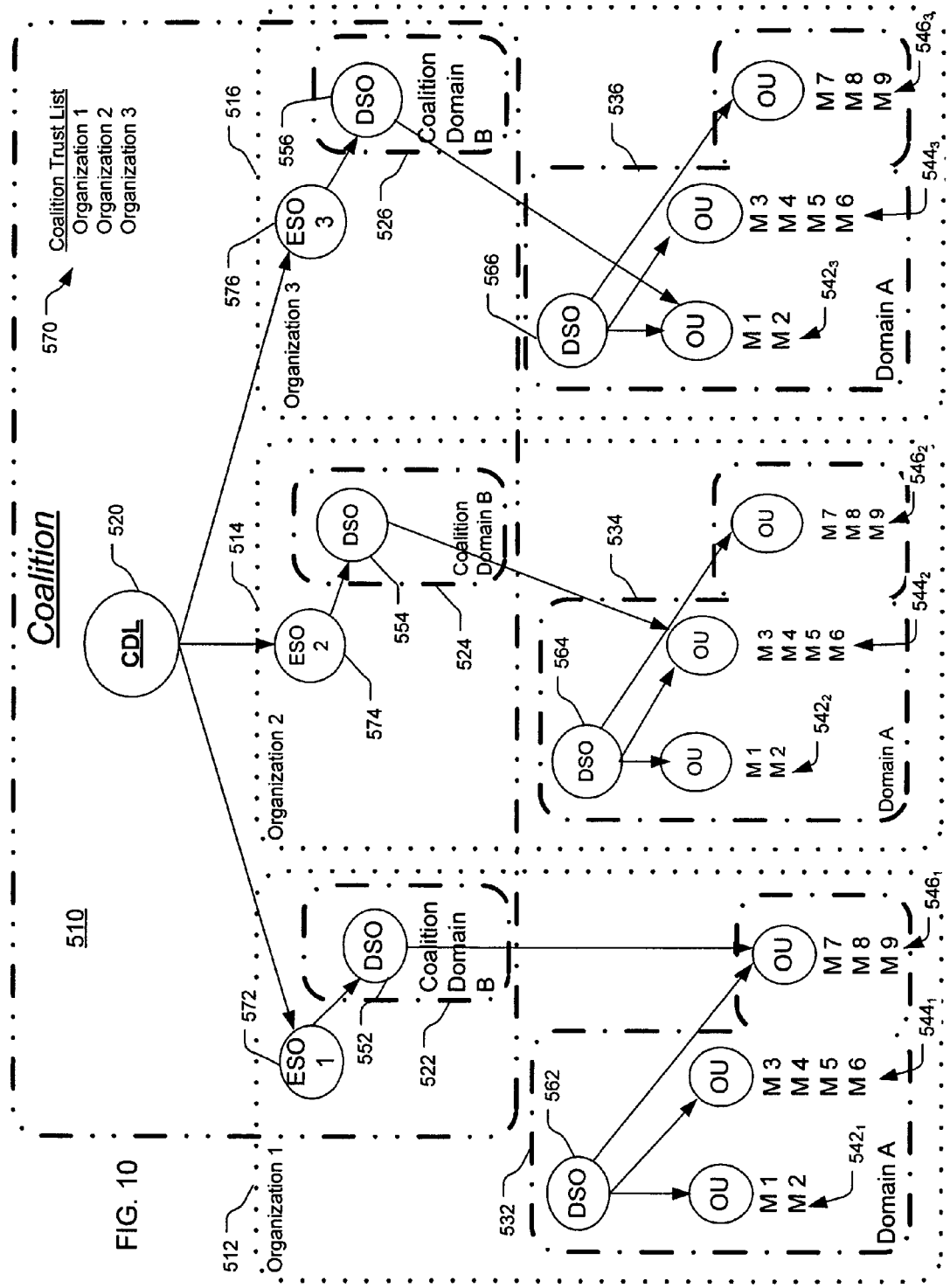
FIG. 10 is a block diagram of a coalition for sharing data.
Figure 11:
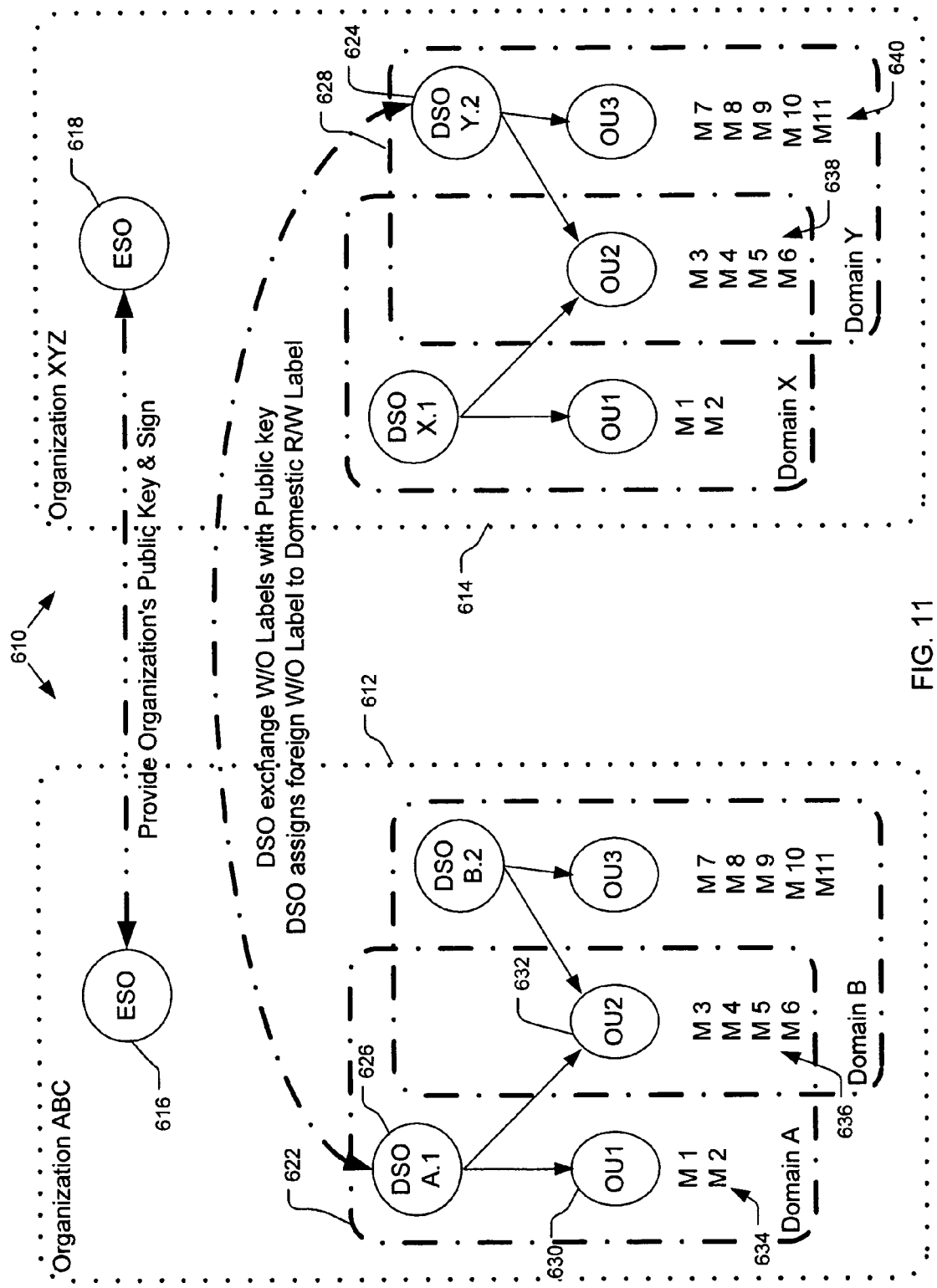
FIG. 11 is a block diagram of label importing and exporting.

Two conventions are provided for supporting cross-domain information sharing within the system's key management solution: 1) Coalition Domain comprising many organizations where participating member organizations have access to read and/or write label pairs (FIG. 10); and 2) Import/Export function for organizations to share public (i.e., write-only) label pairs with other "foreign" organizations (FIG. 11). The following subsections provide a description of each of these methods. Coalition Domains are for larger groups of organizations, e.g., 10 or more organizations. Exemplary groups include militaries, large commercial groups, etc.

Coalition Domain:

In the system 30, four hierarchical conventions are provided for "sharing" information: Coalitions, Organizations, Domains, and Labels. Referring to FIG. 10, a coalition 510 includes three organizations 512, 514, 516. A typical installation of the administration system 32 will be at an organization level which is generally analogous to a Corporation, DoD, military service, government agency, military command, etc. FIG. 10 shows the Organizations 512, 514, 516 participating in the coalition 510. The coalition 510 provides a means for cross- or inter-organization information sharing (i.e., Community of Interest) in coalition domains 522, 524, 526, while a domestic domains 532, 524, 526 provide for intra-organization information sharing. The coalition domains 522, 524, 526 share common domain parameters while the domestic domains 532, 534, 536 do not. Cryptographically, the coalition domains 522, 524, 526 provide a means of sharing specific information among a consortium of members by distributing cryptographic key pairs (read and write), i.e., labels, to all members in the coalition 510. Labels are used to discriminate need-to-know information access or restrictions among members of an organization. The coalition domain provides shared domain parameters, shared read/write labels, member management of its own organization (e.g., an organizations domestic (local) administration can manage coalition domain labels and its own domestic labels), large scalable coalitions, and sub-domains and child domains (explained below).

Organization members (M1-M9) are generally segmented into subgroups 542, 544, 546 of Organization Units (OU1-OU3) for both administrative and practical purposes. Members can belong to one or more domains to facilitate wider information sharing among other members. A domain is defined by a set of encryption parameters that "express" a set of cryptographic keys through a key derivation algorithm implemented by the KPM 420 (FIG. 9).

A coalition is a "super-organization" (COI), both because of its potential size and because it comprises multiple organizations. In the case shown in FIG. 10, the coalition comprises the three organizations 512, 514, 516, but greater numbers of organizations can participate in a coalition (COI). Further, a single organization may participate in multiple coalitions. The coalition permits cross-organization, intra-coalition communication while maintaining the autonomy of participating organizations. This is accomplished by sharing one or more domains (here, the coalition domains 522, 524, 526), along with their cryptographic parameters (e.g., labels and stepping keys along with the Elliptic Curve Diffie-Hellman (ECDH) parameters), across participating organizations (coalition partners 512, 514, 516) while permitting each coalition partner 512, 514, 516 to administer the labels locally (domestically) to their members. Essentially, each coalition partner organization 512, 514, 516 possesses a clone of the coalition domain 522, 524, 526 that exists in all other coalition partner organizations 512, 514, 516. This is accomplished while preserving the scalability for "version" maintenance by means of a Coalition Distribution List (CDL) 520 that is maintained at a central administrator (e.g., a central, networked server, such as the administration system 32, that supports the coalition 510).

The organization 512 includes the two cryptographic domains 522, 532, and the three Organizational Units shown as OU1A ($542_1$), OU1B ($544_1$), and OU1C ($546_1$). The domestic domain 532 provides a means for the organization 512 to maintain cryptographic separation from the coalition 510 and the other organizations 514, 516. The coalition domain 522 is identical with regards to cryptographic parameters and system labels provided to each of the organizations 512, 514, 516 participating in the coalition 510. Members M1 and M2 belong to OU1A $542_1$. Members M3 through M6 are assigned to OU1B $544_1$ while Members M7 through M9 are in OU1C $546_1$. Member management within the organization 512 is performed domestically by a Domain Security Officer (DSO) 552 and a DSO 562, who assign roles to Organizational Units $542_1$, $544_1$, $546_1$, that assigns members, and various Organization Unit Administrators (OUAs) that manage the OUs and are the administrators responsible for assigning roles to individual members within respective Organizational Units (OUs) $542_1$, $544_1$, $546_1$ within the organization 512. The DSOs produce and manage roles, produce and manage labels, and import/export labels.

The organization 514 includes the two cryptographic domains 524, 534, and the three Organizational Units shown as OU1A ($542_2$), OU1B ($544_2$), and OU1C ($546_2$). The domestic domain 534 provides a means for the organization 514 to maintain cryptographic separation from the coalition 510 and the other organizations 512, 516. The coalition domain 524 is identical with regards to cryptographic parameters and system labels provided to each of the organizations 512, 514, 516 participating in the coalition 510. Members M1 and M2 belong to OU1A $542_2$. Members M3 through M6 are assigned to OU1B $544_2$ while Members M7 through M9 are in OU1C $546_2$. The organizations are shown with corresponding OUs having equal numbers of members, but this is not a requirement as organizations can have different quantities of members, and corresponding OUs of different organizations can have different quantities of members. Further, groups of members are shown with multiple members, although a member group may have only one member. Member management within the organization 514 is performed domestically by a DSO 554 and a DSO 564, who assign roles to Organizational Units $542_2$, $544_2$, $546_2$ and various OUAs which is the system administrator responsible for assigning roles to individual members within respective OUs $542_2$, $544_2$, $546_2$ within the organization 514.

The organization 516 includes the two cryptographic domains 526, 536, and the three Organizational Units shown as OU1A ($542_3$), OU1B ($544_3$), and OU1C ($546_3$). The domestic domain 536 provides a means for the organization 516 to maintain cryptographic separation from the coalition 510 and the other organizations 512, 516. The coalition domain 526 is identical with regards to cryptographic parameters and system labels provided to each of the organizations 512, 514, 516 participating in the coalition 510. Members M1 and M2 belong to OU1A $542_3$. Members M3 through M6 are assigned to OU1B $544_3$ while Members M7 through M9 are in OU1C $546_3$. Member management within the organization 516 is performed domestically by a DSO 556 and a DSO 566, who assign roles to Organizational Units $542_3$, $544_3$, $546_3$ and various OUAs which is the system administrator responsible for assigning roles to individual members within respective OUs $542_3$, $544_3$, $546_3$ within the organization 515.

To establish the coalition 510, one of the member organizations 512, 514, 516 hosts the coalition 510. The other member organizations invited to participate in the coalition 510 are considered guests. A Coalition Trust List (CTL) 570 is established by the host and includes a list of the organizations participating in the specific coalition 510. The CDL 520 provides a means to distribute coalition-specific data (e.g., ECDH cryptographic parameters, Labels, Domain GUID, etc.) to each organization 512, 514, 516 participating in the coalition 510. An organization public key maintained in the CDL 520 for the organization 512 is used to distribute the coalition data to an Executive Security Officer (ESO) 572 for the organization 512. ESOs are configured to implement organizational structure and to policies. The ESO 572 uses the private key of the organization 512 to decrypt the coalition data and assign the decrypted data to the coalition domain 522. The DSO 552 in turn assigns a coalition role to the OU $546_1$ within the organization 512. Similarly, the public key maintained in the CDL 520 for the organization 514 is used to distribute the coalition data to an ESO 574 for the organization 514. The ESO 574 uses the private key of the organization 514 to decrypt the coalition data and assign the decrypted data to the coalition domain 524. The DSO 554 in turn assigns a coalition role to the OU $546_2$ within the organization 514. Likewise, the public key maintained in the CDL 520 for the organization 516 is used to distribute the coalition data to an ESO 576 for the organization 516. The ESO 576 uses the private key of the organization 516 to decrypt the coalition data and assign the decrypted data to the coalition domain 526. The DSO 556 in turn assigns a coalition role to the OU $546_3$ within the organization 516.

To facilitate scalability, member administration is performed within specific organizations and is not inherited by the individual coalition organizations 512, 514, 516. The coalition DSOs 552, 554, 556 are assigned by each participating organization 512, 514, 516, respectively, and have the same functions as non-coalition DSOs 562, 564, 566. The DSOs 552, 554, 556 manage the labels and roles, assigning them to the OUs 542, 544, 546 within their domestic organization. OUAs within their respective organizations 512, 514, 516 are responsible for member management (e.g., assigning specific roles to members, etc.). Management overhead associated with members is preferably not increased as organizations are added. A management function is added to support the coalitions 510, that being the coalition DSO 552, 554, 556 within each of the respective organizations 512, 514, 516.

The labels provide a means for sharing data within the coalition 510 or community of interest without replacing or eliminating existing identity-based key management solutions (e.g., PKI) that might already be deployed. Embodiments of the invention can use the existing identity-based key management solution as a means of authentication to distribute labels to specific individuals/members within a designated organization 512, 514, 516.

Multiple Coalitions:

While a domain is an elemental level for administering a cryptographic community, embodiments of the invention provide two subgroups of domains called sub-domains and child domains. Both refine granularity, and child domains convey pedigree as well. Sub-domains can be used as a tool for segregating information or expressing information autonomy within a domain tree. In addition to resolving pedigree, child domains can be employed for constraining the propagation of information throughout a domain tree. Sub-domains and child domains are both subsets of larger COIs, with sub-domain DSOs being able to produce their own labels.

An exemplary coalition might contain a single (coalition) domain. The Coalition host organization's ESO may associate a broad set of coalition guest organizations at the coalition level but spread them over a variety of sub- or child-domains, with each organization participating in one or more coalitions. A domestic clone of the coalition domain is instantiated within the organization schema of each coalition partner organization 512, 514, 516 participating in the specific coalition 510. The convention of assigning organizations at both coalition and domain levels is both an administrative and reporting aid. The association of organizations at the coalition, as opposed to the domain level, facilitates the construction of additional domains within the coalition—all of which is maintained in the CDL 520.

Coalition domains representing COIs may not be entirely identical with regard to the labels and roles they contain. These objects will likely be organization specific since each coalition organization (e.g., the organizations 512, 514, 516) has the potential to participate in sub-coalition arrangements with other organizations, and consequently, may have labels that are common to a few other, but not all, coalition organizations. For example, a broad coalition might encompass the NATO countries. It may be, however, that a sub-coalition, with a shared label pair, might be arranged among the United States, Canada, and Great Britain.

Administrative roles are configured to preserve security and to reduce (if not minimize) and focus responsibilities. In a coalition environment, the benefits of focusing responsibilities and distributing workload for administrators are facilitated through two conventions for defining granularity: sub-coalitions and child coalitions.

Sub-Coalition:

A sub-coalition may be employed to accommodate dynamic expansion within a coalition as well as to provide a means of hierarchical administration. A sub-coalition may have more than a single domain. It may also have its own executive security officer, empowered to create domains and, potentially, sub-coalitions and child coalitions. This can be viewed as an extension of a coalition into various, on-going, "phased" efforts to incorporate a variety of emerging coalition groups. As an example, a coalition's initial and primary purpose was an aggressive military action, but once the objective is accomplished, there is a need for an on-going policing action. Additionally, there may be other "sub-coalitions" that will be involved in areas of humanitarian aid (e.g., staples, medical needs, reconstruction, etc.). These efforts might involve additional coalition partners with varying joint efforts or operations. Sub-coalitions may be spawned primarily as representing granularity, or specialization, while additionally providing autonomy.

Child Coalition:

A child coalition is primarily an extension of a child domain on a coalition rather than an organization scale. A distinction between a child coalition and a sub-coalition is that domains in a child coalition do not create their own labels. A child coalition domain differs from a domestic child domain in that a child coalition derives its labels from "keys" that may be provided by domestic, foreign, and coalition domains. Thus, it is possible to produce a child coalition domain from one or more "parent" domains within an existing coalition. It is also possible to produce a child coalition domain from a label from a coalition domain and from a label received from a foreign organization's domain (although this organization might still be a coalition partner, the domain might exist only within their organization). It is also possible to produce a child coalition domain from a coalition domain and a domestic domain. A child coalition provides a means of distributing administrative responsibilities while preserving supervision or oversight.

Import/Export:

Referring to FIG. 11, a process 610 for label importing and exporting includes the stages shown. The process 610, however, is exemplary only and not limiting. The process 610 may be altered, e.g., by having stages added, removed, or rearranged. Label importing and exporting provides a relatively quick and easy manner for domains from two different organizations (e.g., multi-national coalitions, intelligence communities, law enforcement agencies from federal, state, and local jurisdictions, etc.) to develop small, ad-hoc coalitions by exchanging write-only labels. Label importing and exporting is performed through control of top administrators (ESOs) 616, 618 from each organization 612, 614, respectively. The ESO 616 of the organization 612 identifies a domestic domain 622 within the organization 612 and exchanges signed organizational public encryption keys with the ESO 618 from the organization 614. The ESO 616 puts these public organizational keys and a list of foreign DSO 624 in its own Certificate Trust Lists within its domestic system database 43. Once this has been established, the DSO 626 is allowed to dynamically exchange labels with specified domains 628 of the foreign organization 614 as desired on an ad hoc basis.

FIG. 11 provides an example of domains within different organizations 612, 614 importing/exporting labels to communicate. When the domain 622 of the organization 612 wants to communicate securely with the domain 628 of the organization 614, then in response to a request from the domain 622 the domain 628 sends the public key pair 124 of one of its labels (e.g., a W/O label) to the domain 622. The domain 628 is said to have exported this label to the domain 622, and the domain 622 is said to have imported the label. The (domestic) domain 622 associates one of its own read/write label key pairs (called a domestic label) to the imported label from the (foreign) domain 628. The domestic label associated with an imported foreign label is called a shadow label.

Referring also to FIG. 12, a process 660 for importing and exporting system labels between two different organizations and assigning a "shadow" label for data recovery within their domestic organization includes the stages shown. The process 660, however, is exemplary only and not limiting. The process 660 may be altered, e.g., by having stages added, removed, or rearranged. In this example, a member within the organization 612 can encrypt a plaintext message that a member within the organization 614 can decrypt to produce a plaintext message corresponding to the original.

At stage 662, the ESO 616 from the organization 612, signs, and sends the public portion of its organizational cryptographic key to the organization 614. The organization 614 encrypts a label 1 at stage 664 using the public key of the organization 612 that is maintained in the distribution list of the organization 614. The DSO 624 from the organization 614 exports, at stage 667, the write-only public key pair of label 1 as indicated at 668. The administration system 32 (FIG. 1) is configured to allow exporting of write-only labels 124 and to prevent or inhibit exporting of private key pairs 120 of labels indicated at 670.

At stage 672, the DSO 626 of the organization 612 imports the encrypted exported label public key pair 668 from the organization 614 using the organization's private key pair of the organization 612. Thus, the organization 612 can decrypt the label 1 as indicated at 674 provided by the organization 614. At this point, the DSO 626 of the organization 612 assigns the private 120 and public 124 values of a domestic label A as indicated at 676 as a "shadow" label to the label 674. A role is assigned to the label "set" comprising the imported public key pair 124 of the label 674 and the public/private key pairs 124/120 of the label A 676. The role is assigned by the DSO 626 to Organizational Units 630, 632 within the organization 612. Organization Unit Administrators for each OU in turn can assign the role with the imported label 674 to members 634 and/or 636 within the respective OUs 630, 632. Members with the appropriate roles assigned with the imported label 674 are able to encrypt a plaintext message that can be decrypted by members 638 and/or 640 in the organization 614 that have the corresponding private key pair to the label.

Referring also to FIG. 13, a process 680 for a member from the organization ABC using the imported label 674 to encrypt a plaintext message 682 so that a member from the foreign organization 614 can decrypt the encrypted plaintext includes the stages shown. The process 680, however, is exemplary only and not limiting. The process 680 may be altered, e.g., by having stages added, removed, or rearranged. A member from the organization 612 encrypts, at stage 684, the plaintext message 682 to produce ciphertext indicated by 686 using the imported label 1 indicated by 674 from the organization 614. The KPM 420 (FIG. 9) automatically implements a mandatory Boolean OR-ing function to generate second key encrypting key (KeK) 430, as described above, for the same plaintext message 682. Consequently, there are two KeKs 430 bound to the header of the ciphertext message 686. The ciphertext message 686 is received by members of the organizations 614, 612 that have the roles with the corresponding private key pairs for the label 1 indicated by 688 and the label A private key 690, respectively. The member from the organization 614 uses the corresponding label 1 private key pair 670 to decrypt the ciphertext message 686, at stage 694, in order to generate a plaintext message 692 representative of the original plaintext message 682. Similarly, a member from the organization 612 that has the corresponding label 1 private key pair 690 can decrypt the ciphertext message 686, at stage 696, in order to produce a plaintext message 698 that is representative of the original plaintext message 682. Contrary to public/private key cryptography such as PKI or PGP, the public and private key pairs are assigned to system labels rather than to people.

When members use labels within their domestic domain, they can use corresponding imported W/O labels 674 from the other foreign domains through the association provided by their respective DSO. The member can select the corresponding imported W/O label 674 or not select it, but preferably cannot assign any imported W/O label 674 to any other domestic R/W label with which it was intended to be associated. The imported foreign W/O label 674 is associated with a domestic "shadow" R/W label 676 and the member can use these associated labels to decrypt the encrypted information from within the member's domain. The data that was encrypted using the W/O label 674 from the foreign domain, can be decrypted by the foreign domain's members that have the corresponding read label 670. Thus, information can be shared across domains without giving members from other domains access to information other than what was intended to be shared within your own domestic domain. To provide information sharing across domains from outside organizations, the member selects the data/information to be shared and encrypts the data with the foreign W/O label 674.

When a member within a domain wants to encrypt data that members in a foreign domain can read, the imported label from the foreign domain is used. The shadow label 676 associated with this imported label 674 is also used (mandatory OR-ing function is part of the use of the imported label and is transparent to the member). This means that the DEK will be encrypted at least twice—once with the foreign label 674 and once with the shadow label 676. This uses two different wrapped DEKs as well as two different ephemeral keys, since different Elliptic Curve Domain parameters are being used for each OR-ing function. There is preferably no limit to the number of labels from foreign domains that can be OR-ed together to allow sharing information among various foreign domains. The encrypted object's header, however, will grow linearly for each OR-ing function employed.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A computer program product residing on a computer-readable storage medium and comprising computer-readable instructions configured to cause a computer to:
   use a first one-way, forward-recursive function to produce a first sequence of forward cryptographic base values;
   use a second one-way, backward-recursive function to produce a second sequence of backward cryptographic base values; and
   combine corresponding forward and backward cryptographic base values to produce a third sequence of cryptographic keys.

2. The computer program product of claim 1, wherein the instructions configured to cause a computer to combine the base values are configured to cause the computer to combine an nth forward cryptographic base value of the first sequence and a $(m-n+1)^{th}$ backward cryptographic base value of the second sequence to produce an nth one of the cryptographic keys of the third sequence.

3. The computer program product of claim 1, further comprising key-production instructions configured to cause the computer to send, toward a recipient, at least one of the base values from at least one of the sequences to a recipient, wherein the at least one of the base values corresponds to a limit on which cryptographic keys of the third sequence the recipient will be able to produce.

4. The computer program product of claim 3, wherein the key-production instructions are configured to cause the computer to send one of the forward base values from the first sequence and one of the backward base values from the second sequence wherein the forward base value from the first sequence and the backward base value from the second sequence correspond to a limited range of which of the cryptographic keys of the third sequence the recipient will be able to produce.

5. The computer program product of claim 4, wherein the range is a consecutive group of the cryptographic keys in the third sequence.

6. The computer program product of claim 1, wherein to combine corresponding forward and backward cryptographic base values to produce a third sequence of cryptographic keys comprises combining exactly one forward cryptographic base value from the first sequence and exactly one backward cryptographic base value from the second sequence.

7. A computer-implemented cryptographic method comprising:
   generating a first sequence of forward cryptographic base values using a one-way, forward-recursive function;
   generating a second sequence of backward cryptographic base values using a one-way, backward-recursive function; and
   combining corresponding forward and backward cryptographic base values to produce a third sequence of cryptographic keys.

8. The method of claim 7, wherein the combining comprises combining an nth forward cryptographic base value of the first sequence and a $(m-n+1)^{th}$ backward cryptographic base value of the second sequence to produce an nth one of the cryptographic keys of the third sequence.

9. The method of claim 7, further comprising sending, toward a recipient, at least one of the base values from at least one of the sequences to a recipient, wherein the at least one of the base values corresponds to a limit on which cryptographic keys of the third sequence the recipient will be able to produce.

10. The method of claim 9, wherein the sending comprises sending one of the forward base values from the first sequence and one of the backward base values from the second sequence, wherein the forward base value from the first sequence and the backward base value from the second sequence correspond to a limited range of which of the cryptographic keys of the third sequence the recipient will be able to produce.

11. The method of claim 10, wherein the range is a consecutive group of the cryptographic keys in the third sequence.

12. The method of claim 7, wherein the combining comprises combining exactly one forward cryptographic base value from the first sequence and exactly one backward cryptographic base value from the second sequence.

* * * * *